(12) United States Patent
Vanderlofske, III et al.

(10) Patent No.: US 12,403,674 B2
(45) Date of Patent: Sep. 2, 2025

(54) GLASS LAMINATE INCLUDING REFLECTIVE FILM

(71) Applicant: 3M INNOVATIVE PROPERTIES COMPANY, St. Paul, MN (US)

(72) Inventors: John F. Vanderlofske, III, Minneapolis, MN (US); Eileen M. Franey, Woodbury, MN (US); Stephan J. Pankratz, Eagan, MN (US); Matthew B. Johnson, Woodbury, MN (US); Brianna N. Wheeler, Bloomington, MN (US); Adam D. Haag, Woodbury, MN (US); Kristy A. Gillette, Spring Valley, WI (US); Jonah Shaver, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/746,176

(22) Filed: Jun. 18, 2024

(65) Prior Publication Data

US 2024/0336037 A1 Oct. 10, 2024

Related U.S. Application Data

(62) Division of application No. 17/274,594, filed as application No. PCT/US2019/051733 on Sep. 18, 2019, now Pat. No. 12,049,062.

(Continued)

(51) Int. Cl.
*B32B 17/10* (2006.01)
*B32B 7/12* (2006.01)
(Continued)

(52) U.S. Cl.
CPC .......... *B32B 17/10036* (2013.01); *B32B 7/12* (2013.01); *B32B 17/10458* (2013.01);
(Continued)

(58) Field of Classification Search
CPC ................ B32B 17/10036; B32B 7/12; B32B 2307/416; B32B 2307/42; B32B 17/10458; G02B 5/30; G02B 27/0018; G02B 5/305
(Continued)

(56) References Cited

U.S. PATENT DOCUMENTS 2,433,503 A 12/1947 Young et al.
4,351,681 A 9/1982 Kamerling
(Continued)

FOREIGN PATENT DOCUMENTS

CN 104267498 A 1/2015
CN 106483663 A 3/2017
(Continued)

OTHER PUBLICATIONS

3M Automotive Experience, and EV Solutions: Bringing Fighter Jet Technology to The Automotive Cockpit, [retrieved from the internet on Sep. 17, 2018] URL: <https://www.3m.com/3M/en_US/oem-tier-us/applications/human-machine-interfacesolutions/head-up-display/> ,7 pages.
(Continued)

*Primary Examiner* — Ricky D Shafer
(74) *Attorney, Agent, or Firm* — Clifton F. Richardson

(57) ABSTRACT

A glass laminate including first and second glass layers, a reflective film having opposed first and second major surfaces and disposed between the first and second glass layers with the first and second major surfaces facing the respective first and second glass layers, a first adhesive layer disposed between and bonding together the first glass layer and the
(Continued)

reflective film, and a second adhesive layer disposed between and bonding together the second glass layer and the reflective film is described. The second adhesive layer is thicker than the first adhesive layer such that the first major surface of the reflective film is separated from an outermost major surface of the first glass layer by a distance d1, the second major surface of the reflective film is separated from an outermost major surface of the second glass layer by a distance d2, and $0.05 \leq d1/d2 \leq 0.9$.

5 Claims, 16 Drawing Sheets

Related U.S. Application Data

(60) Provisional application No. 62/735,567, filed on Sep. 24, 2018.

(51) Int. Cl.
  *G02B 5/30* (2006.01)
  *G02B 27/00* (2006.01)

(52) U.S. Cl.
  CPC .. *B32B 17/10743* (2013.01); *B32B 17/10761* (2013.01); *G02B 5/30* (2013.01); *G02B 27/0018* (2013.01); *B32B 2307/416* (2013.01); *B32B 2307/42* (2013.01)

(58) Field of Classification Search
  USPC .................................... 359/485.01
  See application file for complete search history.

(56) References Cited

U.S. PATENT DOCUMENTS

| | | | |
|---|---|---|---|
| 5,091,258 A | 2/1992 | Moran | |
| 5,882,774 A | 3/1999 | Jonza et al. | |
| 5,932,329 A | 8/1999 | Frost et al. | |
| 6,179,948 B1 | 1/2001 | Merrill et al. | |
| 6,259,559 B1 | 7/2001 | Kobayashi et al. | |
| 6,455,141 B1 | 9/2002 | Woodard et al. | |
| 6,783,349 B2 | 8/2004 | Neavin et al. | |
| 6,827,886 B2 | 12/2004 | Neavin et al. | |
| 8,075,983 B2 | 12/2011 | Masaki et al. | |
| 8,670,177 B2 | 3/2014 | Karasawa | |
| 8,824,047 B2 | 9/2014 | Tomoguchi et al. | |
| 9,428,676 B2 | 8/2016 | Lee et al. | |
| 10,156,671 B2 | 12/2018 | Kitagawa et al. | |
| 10,437,054 B2 | 10/2019 | Tso et al. | |
| 12,049,062 B2 * | 7/2024 | Vanderlofske, III | B32B 17/10743 |
| 2004/0135742 A1 | 7/2004 | Weber et al. | |
| 2007/0279755 A1 | 12/2007 | Hitschmann et al. | |
| 2008/0129073 A1 | 6/2008 | Nishikawa | |
| 2010/0285280 A1 | 11/2010 | Yonekura et al. | |
| 2010/0285310 A1 | 11/2010 | Izutani et al. | |
| 2011/0272849 A1 | 11/2011 | Neavin et al. | |
| 2016/0118448 A1 | 4/2016 | Epstein et al. | |
| 2017/0235030 A1 | 8/2017 | Tanaka et al. | |
| 2017/0313032 A1 | 11/2017 | Arndt et al. | |
| 2018/0104932 A1 | 4/2018 | Lu | |
| 2018/0149867 A1 | 5/2018 | Kremers et al. | |
| 2019/0202177 A1 | 7/2019 | Manz et al. | |
| 2020/0147935 A1 | 5/2020 | Patrickson et al. | |

FOREIGN PATENT DOCUMENTS

| | | |
|---|---|---|
| CN | 105264684 B | 1/2018 |
| CN | 108012535 B | 5/2022 |
| EP | 3001236 B1 | 11/2020 |
| EP | 3187917 B1 | 3/2021 |
| JP | 2000219543 A | 8/2000 |
| JP | 2006215174 A | 8/2006 |
| JP | 2017198981 A | 11/2017 |
| JP | 2017206012 A | 11/2017 |
| JP | 2017219624 A | 12/2017 |
| JP | 2019172512 A | 10/2019 |
| WO | 2010074046 A1 | 7/2010 |
| WO | 2014174310 A1 | 10/2014 |
| WO | 2017030654 A1 | 2/2017 |
| WO | 2017103471 A1 | 6/2017 |

OTHER PUBLICATIONS

International Search Report for PCT International Application No. PCT/US2019/051773, mailed on Dec. 20, 2019, 6 pages.

Rezakhaniha, "Experimental Investigation of Collagen Waviness and Orientation in the Arterial Adventitia Using Confocal Laser Scanning Microscopy", Biomech Model Mechanobiol, Jul. 2011; vol. 11, No. 3-4, pp. 461-473.

* cited by examiner

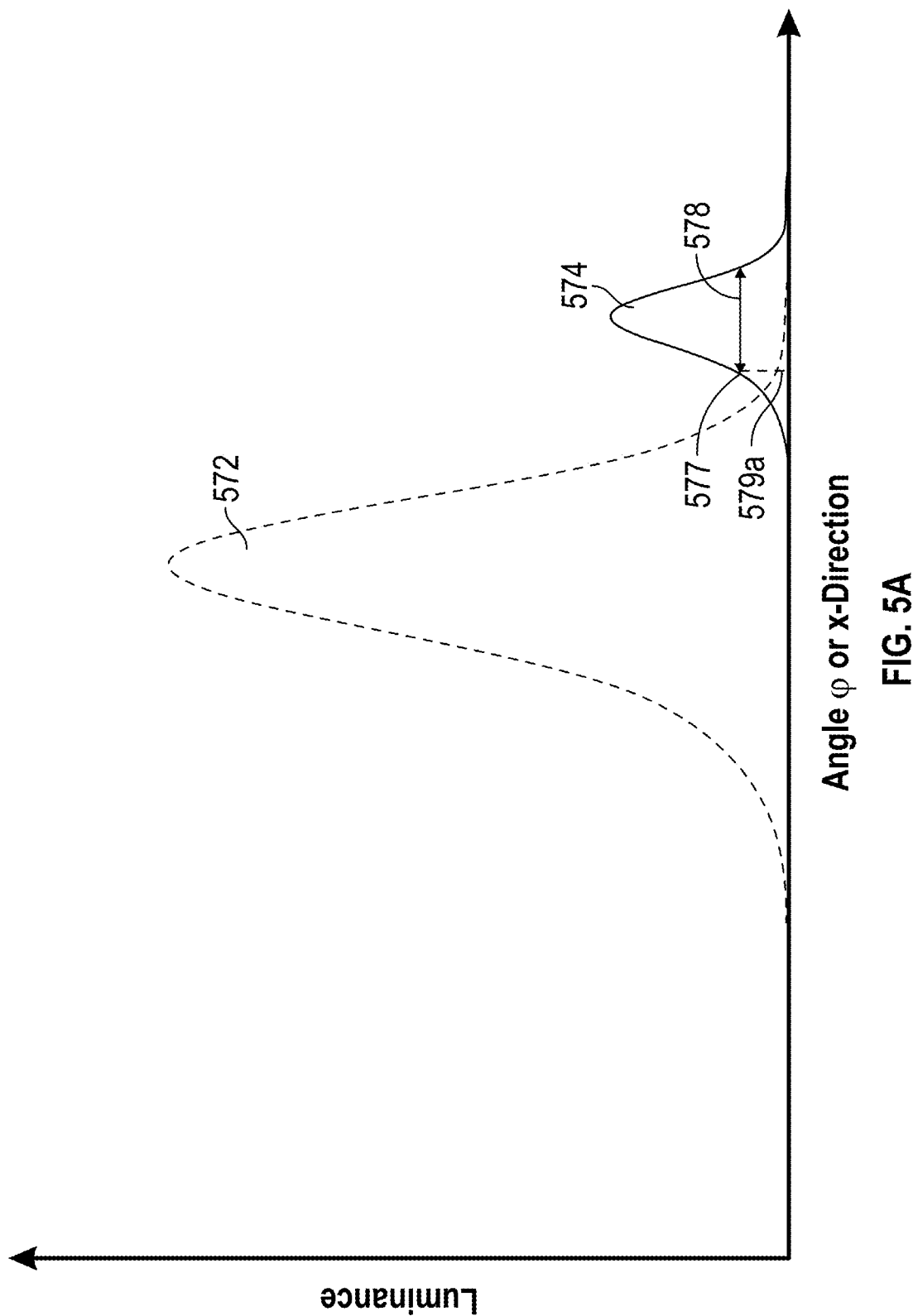

GLASS LAMINATE INCLUDING REFLECTIVE FILM

CROSS REFERENCE TO RELATED APPLICATIONS

This application is a divisional of U.S. application Ser. No. 17/274,594, filed Mar. 9, 2021, now allowed, which is a US 371 Application based on US2019/051733, filed on Sep. 18, 2019, which claims the benefit of U.S. Provisional Application No. 62/735,567, filed Sep. 24, 2018, the disclosures of which are incorporated by reference in their entireties herein.

BACKGROUND

Head-up displays may include a projector to project an image onto a windshield which reflects the projected image to a viewer. In some cases, the windshield is a glass laminate.

SUMMARY

In some aspects of the present description, a glass laminate including first and second glass layers having substantially parallel outermost major surfaces facing away from one another, a reflective film having opposed first and second major surfaces and disposed between the first and second glass layers with the first and second major surfaces facing the respective first and second glass layers, a first adhesive layer disposed between and bonding together the first glass layer and the reflective film, and a second adhesive layer disposed between and bonding together the second glass layer and the reflective film is provided. The reflective film has an average reflectance for a first polarization state in a predetermined visible wavelength range at a predetermined angle of incidence of at least 15% and an average transmittance for an orthogonal second polarization state in the predetermined visible wavelength range at the predetermined angle of incidence of at least 30%. The second adhesive layer is thicker than the first adhesive layer such that the first major surface of the reflective film is separated from the outermost major surface of the first glass layer by a distance d1, the second major surface of the reflective film is separated from the outermost major surface of the second glass layer by a distance d2, and $0.05 \leq d1/d2 \leq 0.9$.

In some aspects of the present description, a glass laminate including first and second glass layers having substantially parallel outermost major surfaces, and a reflective film including a plurality of alternating polymeric interference layers and disposed asymmetrically between the outermost major surfaces is provided. When a light source positioned within 2 m of the glass laminate projects a line onto the outermost major surface of the first glass layer along a first direction making an angle $\theta$ in a range of 30 degrees to 85 degrees with respect to a normal to the glass laminate so that the line extends along a second direction orthogonal to a first plane defined by the first direction and the normal and has a projected luminance distribution about a centerline of the projected line having a full width at half maximum of no more than 0.05 degrees, a first portion of the projected line reflects from the reflective film and a second portion of the projected line reflects from the outermost major surface of the first glass layer. A reflected image of the line includes a primary reflected image portion defined by the reflected first portion and a first ghost portion defined by the reflected second portion. The first ghost portion substantially overlaps with the primary reflected image portion.

In some aspects of the present description, a glass laminate including first and second glass layers having substantially parallel outermost major surfaces, and a reflective film including a plurality of alternating polymeric interference layers and disposed between and adhered to the first and second glass layers through respective first and second adhesive layers is provided. The first adhesive layer has a thickness no more than 0.6 times a thickness of the second adhesive layer. When a light source projects a plurality of parallel lines onto the outermost major surface of the first glass layer along a first direction making an angle $\theta$ in a range of 30 degrees to 85 degrees with respect to a normal to the glass laminate so that the plurality of parallel lines extend along a second direction orthogonal to a first plane defined by the first direction and the normal and are spaced apart along a third direction in the first plane and orthogonal to the first direction, a first portion of each projected line reflects from the reflective film. A reflected image of each line includes the reflected first portion. Each reflected image has a luminance distribution defining a centerline of the reflected image. A distribution of an angle $\alpha$ between the centerlines of the reflected images and the second direction has a full width at half maximum of less than 3 degrees.

BRIEF DESCRIPTION OF THE DRAWINGS

FIGS. 5A-5C are schematic illustrations of illuminance distributions;

DETAILED DESCRIPTION

Figure 1A:
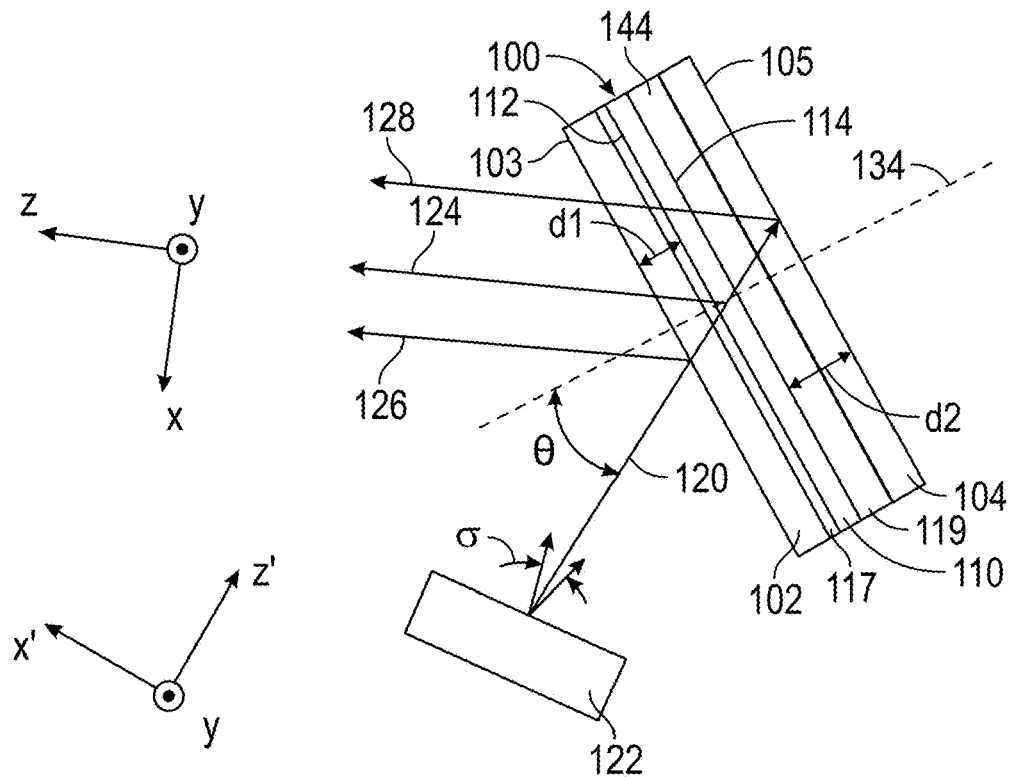
FIGS. 1A-1B are schematic cross-sectional views of a glass laminate and a light source.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Head-up displays typically include a display or projector which projects an image onto a windshield or a combiner which reflects the projected image to a viewer. In some cases, the windshield is a glass laminate which includes a reflective film between two glass layers for reflecting the projected image. Ghost images reflected from outer surfaces of the glass laminate can degrade the image quality of the reflected image. In some cases, a glass laminate has a wedge design that provides a difference in slope between the reflective film and at least one of the outer surfaces of the glass laminate. The difference in slope can be selected to shift the ghost image onto the image reflected by the film so that the ghost does not substantially degrade the sharpness of the reflected image. However, such a wedge design is often not preferred in many embodiments due, at least in part, to the difficulty of providing a desired slope difference in a cost-effective manufacturing process.

According to some embodiments of the present description, it has been found that utilizing a reflective film asymmetrically disposed between glass layers having substantially parallel outermost major surfaces can provide improve perceived image quality by shifting the ghost image that reflects from the front major surface so that it is closer to the primary reflected image. In some embodiments, at least one ghost image substantially overlaps with an image reflected from the reflective film. Traditionally, a relatively thick layer (e.g., 0.76 mm) of polyvinyl butyral (PVB) has been used to laminate glass layers together in a windshield. In some embodiments, a thin (e.g., 50 microns or less) adhesive layer is used to laminate the reflective film to the glass layer facing the projector and a thick a (e.g., 700 microns or more) adhesive layer is used to laminate the reflective film to the opposite glass layer. This has been found to sufficiently shift the ghost image such that it is closer to, or substantially overlaps with, the primary reflected image and so does not substantially degrade the sharpness of the reflected image.

The thinner adhesive layer may be a traditional acrylate-based optically clear adhesive (OCA), for example, instead of a PVB layer commonly used in windshield glass laminates. A windshield glass laminate is sometimes included for its improved impact resistance compared to using a single glass layer. For example, one layer can hold glass fragments in place when an object impacts and cracks the other layer. It has been found that using a layer of OCA as the thin adhesive layer and a layer of PVB as the thick adhesive layer provides an impact resistance comparable to a traditional windshield glass laminate. In particular, in some embodiments, when a 5-pound steel ball is dropped on the glass laminate from 10 feet onto the glass layer adjacent the thicker adhesive layer, the ball is stopped by the laminate and no glass shards are separated from the glass laminate.

Another advantage of the glass laminates according to some embodiments of the present description is improved fidelity of the reflected image. Utilizing a reflective film between glass layers and using traditional windshield adhesive layers can result in a reduced flatness of the reflective film and this can result in a waviness when a line is projected onto the glass laminate, for example. It has been found that using a thinner adhesive layer on the side of the reflective film facing the projector reduces this waviness.

FIG. 1A is a schematic cross-sectional view of a glass laminate 100 and a light source 122. The glass laminate 100 includes first and second glass layers 102 and 104 having substantially parallel outermost major surfaces 103 and 105 facing away from one another, and a reflective film 110 having opposed first and second major surfaces 112 and 114 and disposed between the first and second glass layers 102 and 104 with the first and second major surfaces 112 and 114 facing the respective first and second glass layers 102 and 104. In some embodiments, the reflective film 110 has an average reflectance for a first polarization state (e.g., polarization state 131 depicted in FIG. 1B which is a p-polarization state in the illustrated embodiment) in a predetermined visible wavelength range at a predetermined angle of incidence of at least 15% (e.g., in a range of 15%-30%, or about 20%) and an average transmittance for an orthogonal second polarization state (e.g., polarization state 132 depicted in FIG. 1B which is an s-polarization state in the illustrated embodiment) in the predetermined visible wavelength range at the predetermined angle of incidence of at least 30%. In some embodiments, the reflective film 110 includes a plurality of alternating polymeric interference layers as described further elsewhere herein. The glass laminate 100 includes a first adhesive layer 117 disposed between and bonding together the first glass layer 102 and the reflective film 110, and a second adhesive layer 119 disposed between and bonding together the second glass layer 104 and the reflective film 110. The second adhesive layer 119 can optionally include an optically absorbing material 144 as described further elsewhere herein.

In some embodiments, the second adhesive layer 119 is thicker than the first adhesive layer 117 such that the first major surface 112 of the reflective film 110 is separated from the outermost major surface 103 of the first glass layer 102 by a distance d1, the second major surface 114 of the reflective film 110 is separated from the outermost major surface 105 of the second glass layer 104 by a distance d2, and $0.05 \leq d1/d2 \leq 0.9$. In some embodiments, $0.05 \leq d1/d2 \leq 0.8$, or $0.1 \leq d1/d2 \leq 0.8$, or $0.2 \leq d1/d2 \leq 0.7$. In some embodiments, the second adhesive layer 119 is at least 2, 3, 5, 10, 20, 50, 100, or 200 times thicker than the first adhesive layer 117. In some embodiments, the first adhesive layer 117 has a thickness in a range of 1 micron to 100 microns and the second adhesive layer 119 has a thickness in a range of 100 microns to 1000 microns. In some embodiments, the first adhesive layer 117 has a thickness in a range of 1 micron to 50 microns and the second adhesive layer 119 has a thickness in a range of 700 microns to 1000 microns.

In some embodiments, the first and second glass layers 102 and 104 have a substantially same thickness. In this context, substantially same thickness means within 5% of one another. In some embodiments, the first glass layer 102 has a thickness in a range of 0.95 to 1.05, or 0.97 to 1.03, or 0.98 to 1.02 times a thickness of the second glass layer 104. In some embodiments, the second glass layer 104 is thicker than the first glass layer 102. In some embodiments, the second glass layer 104 is at least 1.2 times, or 1.5 times, or 1.8 times, or 2 times thicker than the first glass layer 102. In some embodiments, the second glass layer 104 is no more than 4 times, or 3 times or 2.5 times thicker than the first glass layer 102. Using a thinner first glass layer 102 positions a first ghost image closer to a primary reflected image but using a thicker first glass layer 102 (e.g., having a thickness similar to that of the second glass layer 104) improves impact resistance. In some embodiments, the first glass layer 102 has a thickness less than 2.2 mm, or less than 2 mm, or less than 1.5 mm, or less than 1.2 mm. In some embodiments, the first glass layer 102 has a thickness greater than 0.6 mm, or greater than 0.8 mm.

Figure 1B:
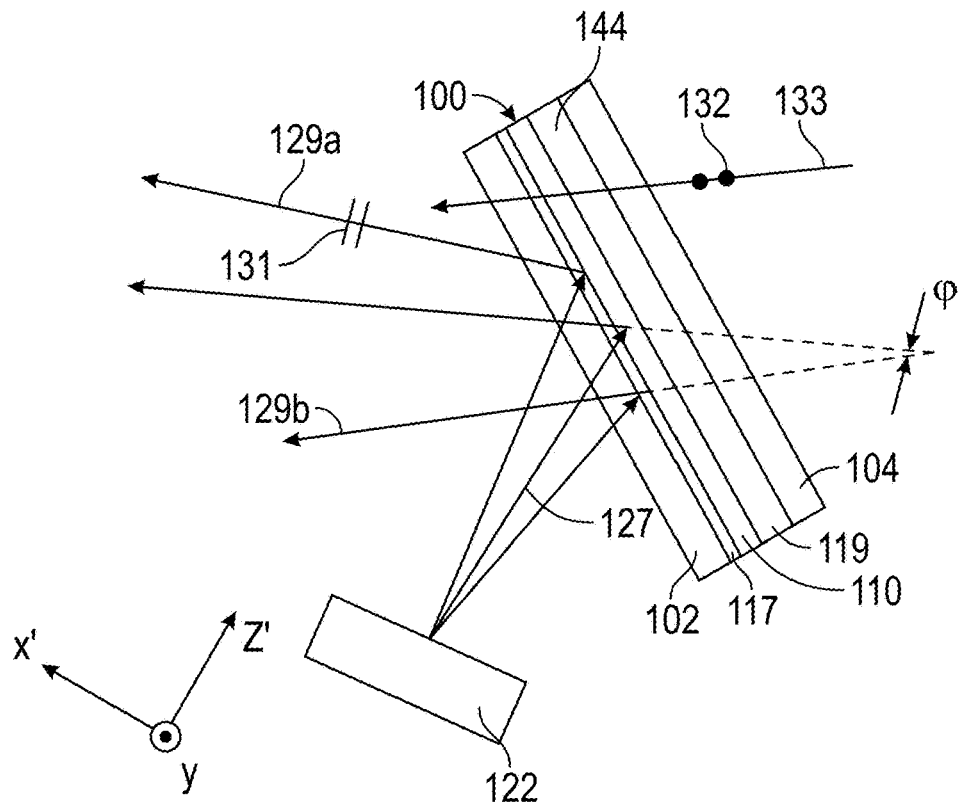

In some embodiments, the light source 122 emits or projects an image of a line having a projected luminance distribution about a centerline of the projected line having a full width at half maximum σ. The luminance distribution may be expressed as a function of the x-coordinate illustrated in FIG. 1A or in terms of an angle from a peak luminance direction or from a central ray 127 as schematically illustrated in FIG. 1B. Non-central rays 129a and 129b are also illustrated in FIG. 1B. Ray 129b makes an angle φ with the central ray 127. The luminance distribution can be expressed in terms of the angle φ, where positive φ in FIG. 1B corresponds to positive x-coordinate in FIG. 1A. The luminance distribution can be determined using a detector having an input aperture in a plane perpendicular to a central ray reflected from the reflective film 110 (e.g., the x-y plane referring to the x-y-z coordinate system of FIG. 1A). Suitable detectors include the PROMETRIC 18 imaging colorimeter available from Radiant Vision Systems (Redmond, WA). The luminosity, which may also be referred to a brightness, can be defined as an integral over wavelengths of the radiance times the photopic luminosity function defined by the Commission Internationale de l'Éclairage (CIE) in the CIE 1931 color space. Any relations described herein regarding luminance or luminance distribution may also hold for radiance or radiance distribution or for intensity or intensity distribution.

In some embodiments, the light source 122 projects polarized light having a first polarization state 131. An ambient light ray 133 having a second polarization state 132 is illustrated in FIG. 1B as being transmitted through reflective film 110 which may be a reflective polarizer. The light source 122 may be or include a display such as a liquid crystal display (LCD) or an organic light emitting diode (OLED) display. In some embodiments, various optical components (e.g., curved mirror(s) and/or optical lens(es)) are included in the light source 122 to provide the desired light output to the glass laminate 100.

Figure 2:
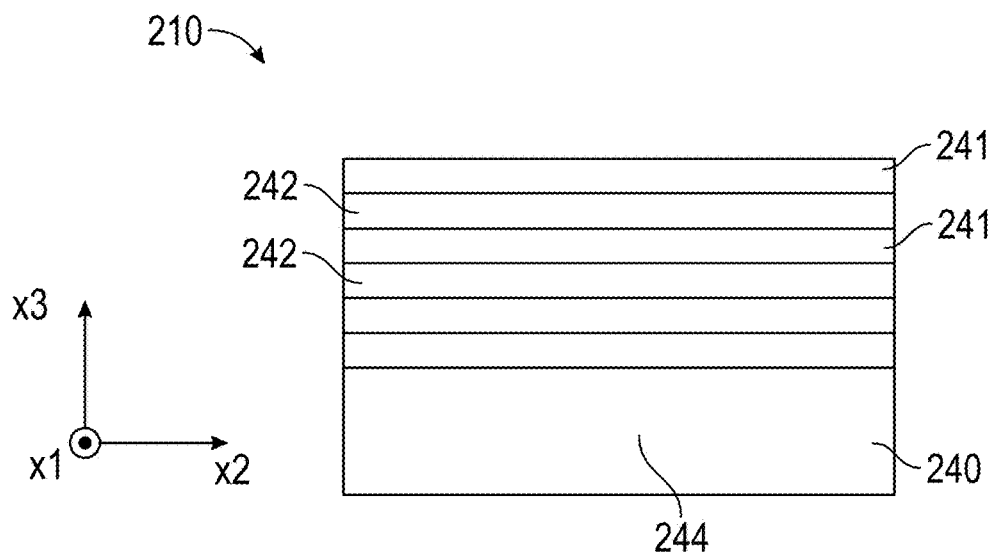
FIG. 2 is a schematic cross-sectional view of an optical film.

FIG. 2 is a schematic cross-sectional view of a reflective film 210, which may correspond to reflective film 110. Reflective film 210 includes a plurality of alternating polymeric interference layers 241 and 242. In the illustrated embodiments, the plurality of alternating polymeric interference layers 241 and 242 is disposed on an optional skin layer 240. In some embodiments, a second skin layer is disposed adjacent the plurality of alternating polymeric interference layers 241 and 242 opposite the skin layer 240. The skin layer 240 may optionally include optically absorbing material 244. Optically absorbing material 244 may be dyes, pigments, or a combination thereof which may be dispersed in a polymeric material of the skin layer 240. In some embodiments, at least one of the inference layers 241 or 242 is oriented along a first direction (e.g., x1-direction), and the optically absorbing material 244 is or includes a dichroic dye at least partially oriented along the first direction. Any of these optically absorbing materials may optionally be included in second adhesive layer 119 instead of or in addition to be including in the skin layer 240. The optically absorbing material may be included to reduce the brightness of a ghost image reflected from the outermost major surface 105 as described further elsewhere herein.

Interference layers reflect and transmit light primarily by optical interference. Reflecting and transmitting light primarily by optical interference means that the reflectance and transmittance of the interference layers can be reasonably described by optical interference or reasonably accurately modeled as resulting from optical interference. Adjacent pairs of interference layers having differing refractive indices reflect light by optical interference when the pair has a combined optical thickness (refractive index times physical thickness) of ½ the wavelength of the light. Interference layers typically have a physical thickness of less 250 nm or less than 200 nm. Skin layers are typically noninterference layers which have an optical thickness too large to reflect and transmit light primarily by optical interference and typically have a physical thickness of greater than 1 micron or greater than 2 microns. The reflective film 210 can include many more interference layers than schematically illustrated in FIG. 2. For example, the reflective film 210 can include between 50 and 800 interference layers.

Suitable materials for the alternating interference layers 241 and 242 and for the skin layer 240 include, for example, polyethylene naphthalate (PEN), copolymers containing PEN and polyesters (e.g., polyethylene terephthalate (PET) or dibenzoic acid), glycol modified polyethylene terephthalate (PETg), polycarbonate (PC), poly(methyl methacrylate) (PMMA), or blends of these classes of materials.

Exemplary reflective films composed of polymer materials may be fabricated using coextruding, casting, and orienting processes. Methods of making such films are described in U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films". Useful reflective films for use in head-up displays are described in U.S. Pat. Appl. No. 2004/0135742 (Weber et al.).

The reflective film may be a partial mirror or a partial reflective polarizer, for example. In some embodiments, the reflective film is oriented primarily along the x1 direction and has a stronger reflectivity for a first polarization state having the electric field along the x1 direction and a lower reflectivity for a second polarization state having the electric field along the x2 direction, referring to the x1-x2-x3 coordinate system illustrated in FIG. 2.

In some embodiments, the reflective film 110 or 210 has an average reflectance for a first polarization state in a predetermined visible wavelength range at a predetermined angle of incidence of at least 15% and an average transmittance for an orthogonal second polarization state in the predetermined visible wavelength range at the predetermined angle of incidence of at least 30%. The predetermined visible wavelength range may be the entire visible wavelength range (about 400 nm to about 700 nm) or a portion of the visible wavelength range. In some embodiments, the predetermined visible wavelength range extends at least from 450 nm to 650 nm. In some embodiments, the predetermined visible wavelength range extends from 400 nm to 700 nm. In some embodiments, the reflective film 110 or 210 is reflective in narrow bands corresponding to wavelengths transmitted by red, green, and blue subpixels of a display, for example. In this case, the predetermined wavelength range may be a disjoint union of a red range, a green range, and a blue range. This can allow the reflective film to be transmissive for both polarization states for wavelengths between the red range and the green range and between the green range and the blue range and so can increase the transparency of the reflective film for ambient light.

The predetermined angle of incidence may be the angle θ (see FIG. 1A) where a light source 122 is adapted to project onto the glass laminate. The predetermined angle of incidence and/or the angle θ may be in a range of 30 degrees to 85 degrees, or in a range of 50 degrees to 75 degrees, or in a range of 55 degrees to 70 degrees, or in a range of 55 degrees to 68 degrees, or in a range of 59 degrees to 68 degrees, or in a range of 55 degrees to 65 degrees, or in a range of 62 degrees to 65 degrees, or the predetermined angle may be about 55 degrees (e.g., 50 to 60 degrees, or 51 to 59 degrees), about 62 degrees (e.g., 58 to 66 degrees, or 59 to 65 degrees) or about 65 degrees (e.g., 61 to 69 degrees, or 62 to 68 degrees), for example.

In some embodiments, the average reflectance of the reflective film 110 or 210 for the first polarization state in the predetermined visible wavelength range at the predetermined angle of incidence is at least 20%, or at least 50%, or at least 70%. In some embodiments, the average transmittance if the reflective film 110 or 210 for the second polarization state in the predetermined visible wavelength range at the predetermined angle of incidence is at least 50%, or at least 70%.

The average reflectance and average transmittance in the predetermined wavelength range refers to the reflectance and transmittance averaged (unweighted) over wavelengths in the predetermined wavelength range. The reflectance and transmittance are determined for light incident on the reflective film in air, unless indicated differently.

In some embodiments, the reflective film includes absorbing material on one side of the film (e.g., in a skin layer) and not on the other or includes more absorbing material on one side than the other. In this case, the reflectance and transmittance are determined for light incident on the reflective film on the side of the film opposite the absorbing material or opposite the side that is more absorbing. In some embodiments, the reflective film 210 is disposed between the first and second glass layers 102 and 104 with the skin layer 240 facing the second glass layer 104 and with absorbing material included in the skin layer 240. As described further elsewhere herein, this may be done to reduce the luminance of a ghost image reflected from the outermost major surface 105 of the second glass layer 104.

When a reflective film is included in a glass laminate using PVB layers having thicknesses traditionally used in glass laminates of windshields, a distortion of an image reflected from the reflective film can occur due to a reduced flatness of the film. According to the present description, when a thin adhesive layer, such as a thin layer of optically clear adhesive (e.g., an optically clear adhesive (e.g., acrylate based) commonly used in optical components), is used in place of a PVB layer having a thickness traditionally used in windshield laminates, that this distortion can be substantially reduced.

Figure 3A:
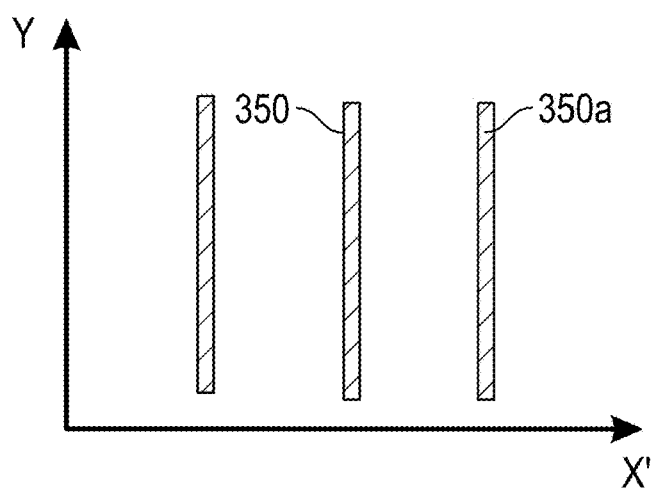
FIG. 3A is a schematic illustration of projected lines.
Figure 3B:
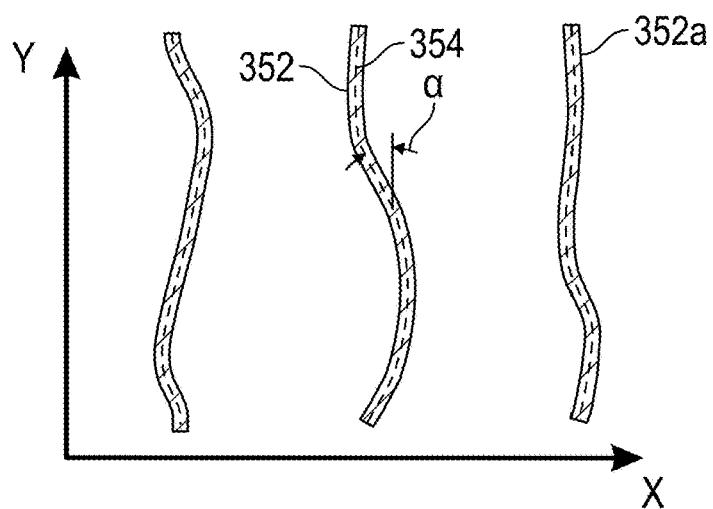
FIG. 3B is a schematic illustration of reflected lines.
Figure 3C:
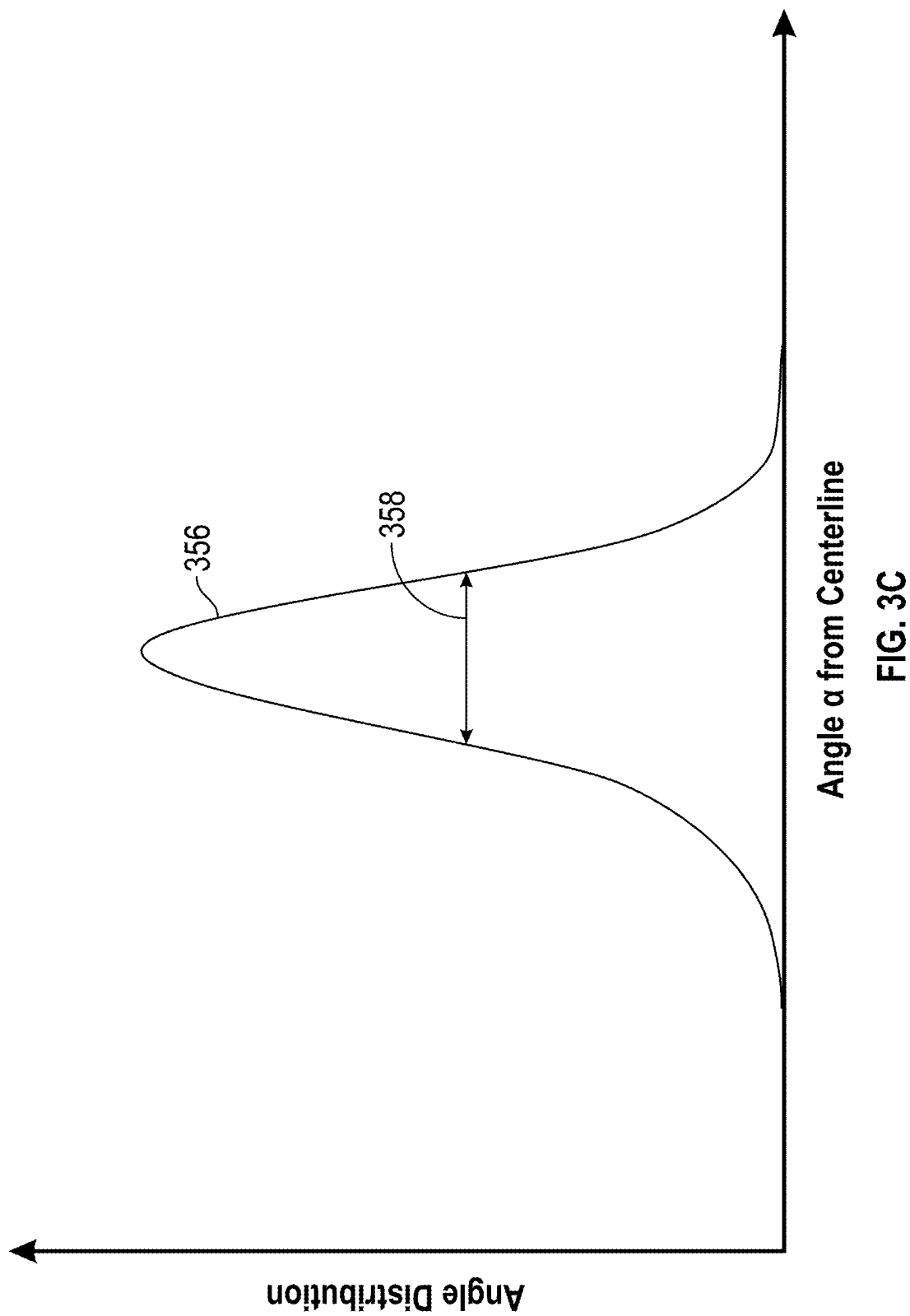
FIG. 3C is a schematic illustration of a distribution of angles between centerlines of the reflected lines of FIG. 3B and a specified direction.

FIG. 3A is a schematic illustration of a plurality of parallel lines 350 which can be projected by a light source 122 onto the glass laminate 100. FIG. 3B is a schematic illustration of reflected image 352 of the plurality of parallel lines 350. FIG. 3C is a schematic illustration of a distribution 356 of an angle α between centerlines 354 of the reflected images 352 and the y-direction (see FIG. 1A). The distribution 356 has a full width at half maximum 358 which may be less than 3 degrees, for example.

The light source 122 projects a light 120 onto the glass laminate 100. Portions 124, 126 and 128 of the light reflect from the glass laminate 100. The projected light 120 may be a projected line or a plurality of projected lines, for example. The portions 124, 126, and 128 can refer to portions of a projected line or portions of a plurality of projected lines as will be clear from the context. In some embodiments, the projected line(s) is in the first polarization state (e.g., a p-polarization state). In other embodiments, the projected line(s) are unpolarized.

The term "parallel lines" should be understood to refer to straight lines that are parallel to one another unless indicated differently. The term "projected line" should be understood to refer to a projected straight line unless indicated differently. However, the term "centerline" is used to refer to a curve or line which may or may not be a straight line (e.g., the centerlines may be curved and/or irregular).

In some embodiments, a glass laminate 100 includes first and second glass layers 102 and 104 having substantially parallel outermost major surfaces 103 and 105; and a reflective film 110 or 210 including a plurality of alternating polymeric interference layers 241 and 242 and disposed between and adhered to the first and second glass layers 102 and 104 through respective first and second adhesive layers 117 and 119, where the first adhesive layer 117 has a thickness no more than 0.6 times (or no more than 0.5 times, or no more than 0.4 times, or no more than 0.2 times, or no more than 0.1 times) a thickness of the second adhesive layer 119, such that when a light source 122 projects a plurality of parallel lines 350 onto the outermost major surface 103 of the first glass layer 102 (and through the first glass layer to the reflective film) along a first direction (z' direction) making an angle θ in a range of 30 degrees to 85 degrees with respect to a normal 134 to the glass laminate 100 so that the plurality of parallel lines 350 extend along a second direction (y direction) orthogonal to a first plane (x'-z' plane) defined by the first direction and the normal 134 and are spaced apart along a third direction (x'-direction) in the first plane and orthogonal to the first direction, a first portion 124 of each projected line reflects from the reflective film 110 or 210, where a reflected image 352 of each line includes the reflected first portion 124, each reflected image 352 has a luminance distribution defining a centerline 354 of the reflected image 352, and a distribution 356 of an angle α between the centerlines 354 of the reflected images 352 and the second direction (y-direction) has a full width at half maximum 358 of less than 3 degrees. The distribution 356 can be obtained by determining the angle α between the centerline 354 and the second direction at a plurality of locations along each line to determine the overall distribution of α. The plurality of locations can be selected at uniform intervals along the second direction and the number of locations can be increased until a statistical measure of the distribution, such as the full width at half maximum 358, converges. Related image analysis procedures which can be used to determine the distribution of the orientation of the centerline tangent angle α are described in "Experimental investigation of collagen waviness and orientation in the arterial adventitia using confocal laser scanning microscopy", Rezakhaniha et al., *Biomech Model Mechanobiol*, 2012 March; 11 (3-4); 461-73; doi: 10.1007/s10237-011-0325-z. In some embodiments, the full width at half maximum 358 of the distribution 356 of the angle α is less than 2 degrees, or less than 1.5 degrees, or less than 1.2 degrees, or less than 1.1 degrees.

In some embodiments, the light source 122 is positioned within 2 m, 1.5 m, 1.2 m, or 1 m of the glass laminate 100. The distance between the light source 122 and the glass laminate 100 is the distance along a central light ray from the light source 122 to the glass laminate 100 (e.g., the distance between the light source 122 and the glass laminate 100 along the light 120).

Figure 4:
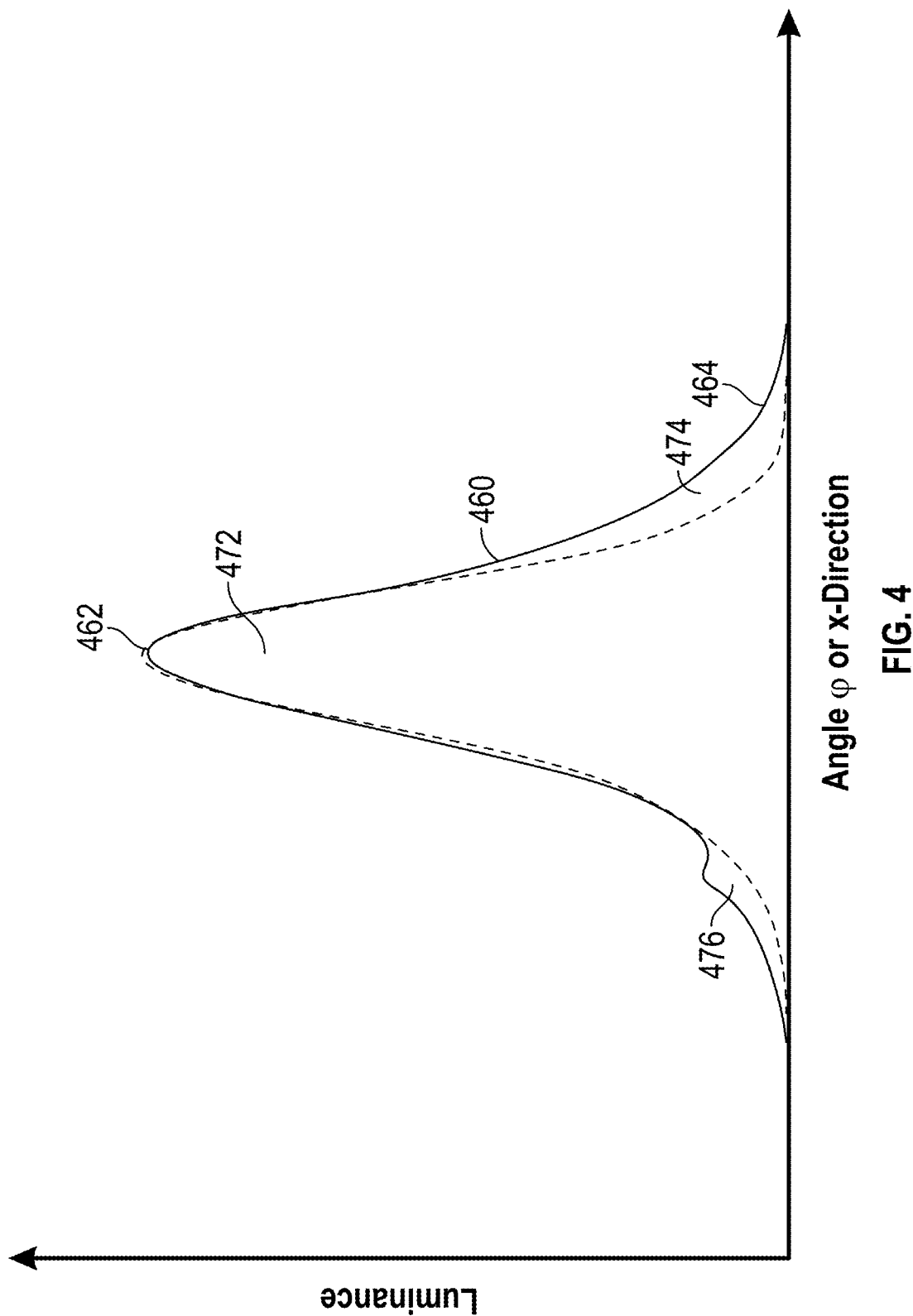
FIG. 4 is a schematic illustration of a reflected luminance distribution 460 of a reflected image.

FIG. 4 is a schematic illustration of a reflected luminance distribution 460 of a reflected image. The distribution may be expressed in terms of a lateral dimension (x-dimension) at a detector location or in terms of an angle from a peak luminance direction (see, e.g., the angle φ illustrated in FIG. 1B). The distribution can be determined over a length of the line and so a non-zero angle α (see FIG. 3B) to the y-direction can increase the width of the distribution.

In some embodiments, a glass laminate 100 includes first and second glass layers 102 and 104 having substantially parallel outermost major surfaces 103 and 105; and a reflective film 110 or 210 including a plurality of alternating polymeric interference layers 241 and 242 and disposed asymmetrically between the outermost major surfaces 103 and 105 such that when a light source 122 positioned within 2 m of the glass laminate 100 projects a line 350a onto the outermost major surface 103 of the first glass layer 102 (and through the first glass layer to the reflective film) along a first direction (z' direction) making an angle θ in a range of 30 degrees to 85 degrees with respect to a normal 134 to the glass laminate 100 so that the line extends along a second direction (y direction) orthogonal to a first plane (x'-z' plane) defined by the first direction and the normal 134 and has a projected luminance distribution about a centerline of the projected line having a full width at half maximum σ of no more than 0.05 degrees, a first portion 124 of the projected line 350a reflects from the reflective film and a second portion 126 of the projected line 350a reflects from the outermost major surface 103 of the first glass layer 102, a reflected image 352a of the line including a primary reflected image portion 472 (portion under dotted line in FIG. 4) defined by the reflected first portion 124 and a first ghost portion 474 (a portion between the dotted line and the solid line in FIG. 4) defined by the reflected second portion 126. The first ghost portion 474 substantially overlaps with the primary reflected image portion 472.

In some embodiments, a third portion 128 of the projected line 350 reflects from the outermost major surface 105 of the second glass layer 104, and the reflected image 352 of the line further includes a second ghost portion 476 (a portion between the dotted line and the solid line in FIG. 4) defined by the reflected third portion 138, where the second ghost portion 476 substantially overlaps with the primary reflected image portion 472.

In some embodiments, the reflected image 352a has a reflected luminance distribution 460 having a maximum at a peak 462 of the reflected luminance distribution 460 and decreasing monotonically in at least one lateral direction (+x direction) away from the peak 462 to an edge 464 of the reflected image 352a. The edge 464 can be taken to be where the luminance drops to 5% of the maximum luminance.

In some embodiments, the reflected image 352a has a reflected luminance distribution 460, where a contribution to the reflected luminance distribution 460 from the first ghost portion 474 is not separately resolvable from a contribution to the reflected luminance distribution 460 from the primary reflected image portion 472 in a plot of the reflected luminance distribution 460. The contribution from the first ghost portion 474 is not separately resolvable from the contribution from the primary reflected image portion 472 when there are no features in the distribution 460 that can be attributed to the first ghost portion 474 without reference to the primary reflected image portion 472. For example, there are no local maxima or inflection points that can be attributed to the first ghost portion 474. The first ghost portion 474 can be determined once the primary reflected portion 472 is determined. The primary reflected portion 472 can be determined from known luminance distribution of the projected line which allows the reflected luminance distribution to be determined when no ghosts are present. In the illustrated embodiment, the second ghost portion 476 is separately resolvable from the contribution from the primary reflected image portion 472 due to the presence of a local maxima and an inflection point on the left-hand side of the distribution 460.

In some embodiments, the full width at half maximum of the projected line is no more than 0.03 degrees, or no more than 0.02 degrees. In some embodiments, the reflected image has an angular distribution of luminance having a full width at half maximum of no more than 0.1 degrees, or no more than 0.07 degrees, or no more than 0.05 degrees.

Figure 5B:
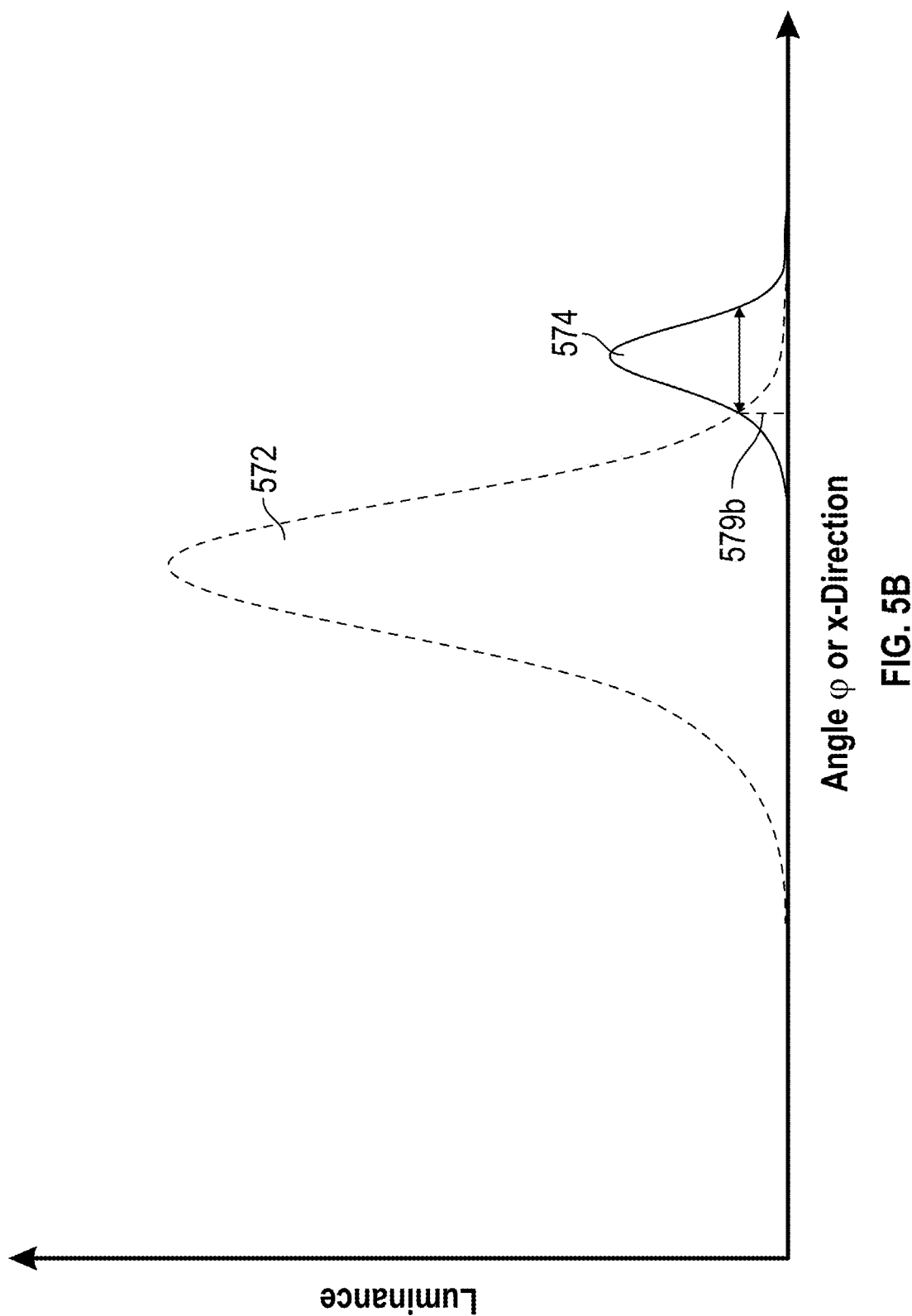
Figure 5C:
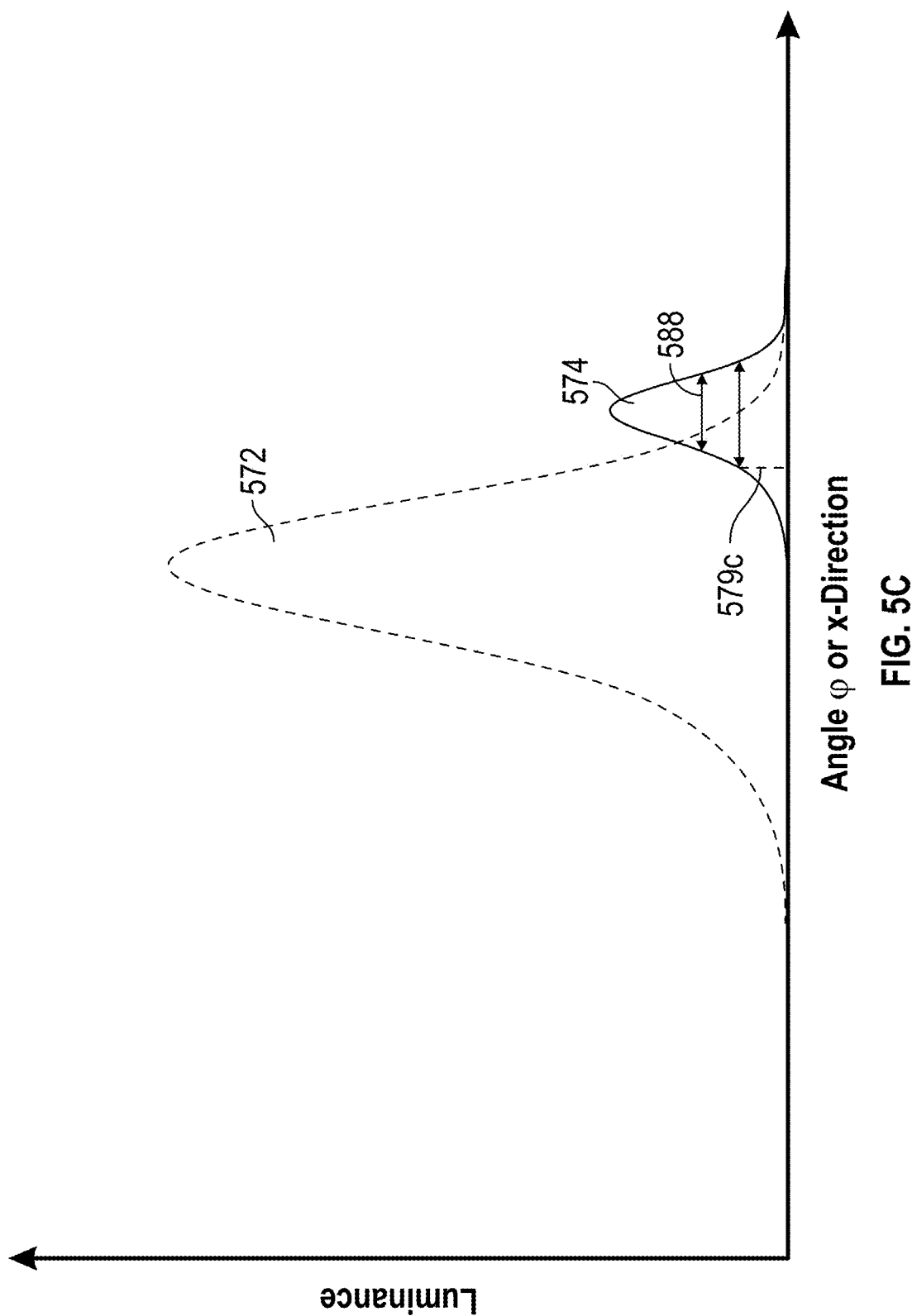

A portion of the reflected image substantially overlaps with another portion of the reflected image if the luminance of the portion having a larger maximum luminance is at least as large as the luminance of the other portion at the position (angular or linear) of a quarter maximum of the other portion. This is schematically illustrated in FIGS. 5A-5C. In FIG. 5A, the luminance of the primary reflected image portion 572 is substantially less than the luminance 577 at a quarter maximum of the first ghost portion 574 at the position 579a of the quarter maximum. The full width at quarter maximum 578 of the first ghost portion 574 is indicated. The position 579a is the quarter maximum position closest to the primary reflected image portion 572. In FIG. 5B, the luminance of the primary reflected image portion 572 is equal to the luminance 577 at a quarter maximum of the first ghost portion 574 at the position 579b of the quarter maximum. In FIG. 5C, the luminance of the primary reflected image portion 572 is greater than the luminance 577 at a quarter maximum of the first ghost portion 574 at the position 579c of the quarter maximum. In the case illustrated in FIG. 5C, the luminance of the primary reflected image portion 572 is greater than the luminance at a half maximum of the first ghost portion 574 at a position of the half maximum. The full width at half maximum 588 of the first ghost portion 574 is indicated in FIG. 5C. The first ghost portion 574 substantially overlaps with the primary reflected image portion 572 in the cases illustrated in FIGS. 5B and 5C, but not in the case illustrated in FIG. 5A. Overlap of the second ghost portion with the primary reflected image portion is defined similarly. In some embodiments where a portion of the reflected image is described as substantially overlapping with another portion of the reflected image, the luminance of the portion having a larger maximum luminance is at least as large as the luminance of the other portion at the position (angular or linear) of a half maximum of the other portion.

Figure 6A:
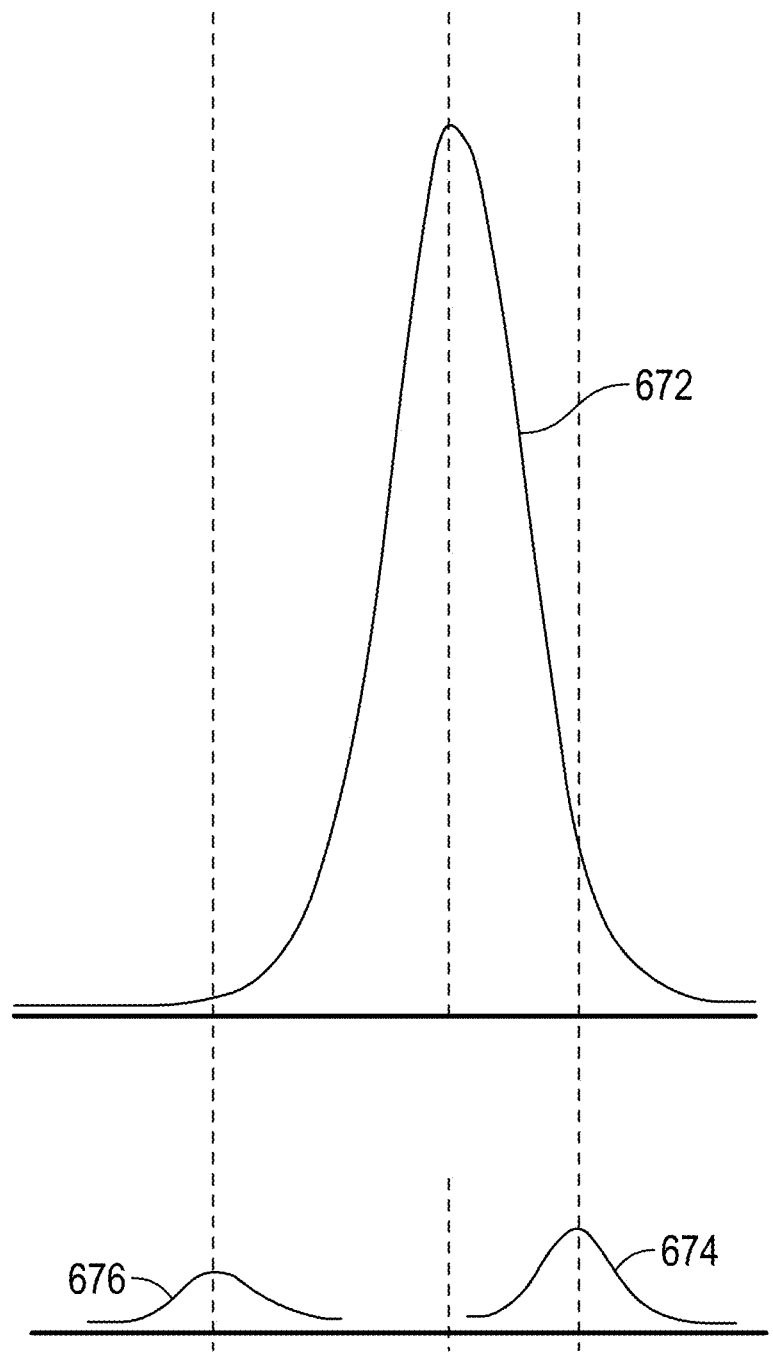
FIG. 6A is a schematic illustration of a luminance distribution of a primary reflected image portion and first and second ghost portions.
Figure 6B:
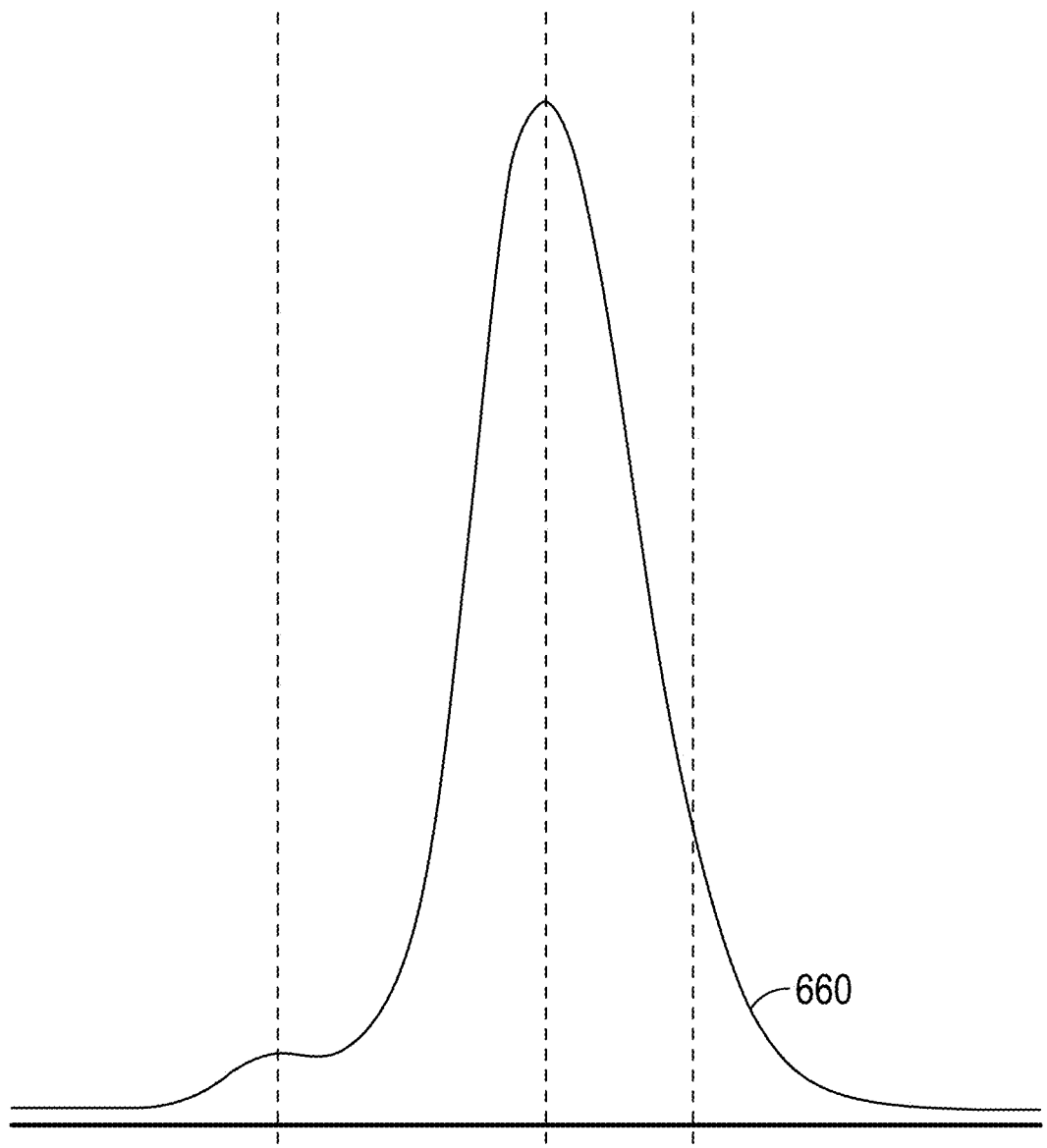
FIG. 6B is a schematic illustration of a reflected luminance distribution which includes contributions from the primary reflected image portion and the first and second ghost portions of FIG. 6A.

FIG. 6A schematically illustrates a luminance distribution of a primary reflected image portion 672 substantially overlapping with first and second ghost portions 674 and 676. FIG. 6B schematically illustrates the reflected luminance distribution 660 which includes contributions from the primary reflected image portion 672 and the first and second ghost portions 674 and 676. The dotted lines indicate locations of peaks in the primary reflected image portion 672 and the first and second ghost portions 674 and 676. The vertical direction (direction along the dotted lines) represents luminance in arbitrary units and the horizontal direction represents angular or linear displacement.

In some embodiments, the glass laminate 100 includes optically absorbing material disposed between the first glass layer 102 and the outermost major surface 105 of the second glass layer 104. In some embodiments, the optically absorbing material is disposed between the reflective film 110 and the outermost major surface 105 of the second glass layer 104, or between alternating polymeric interference layers of the reflective film 110 and the outermost major surface 105 of the second glass layer 104. In some embodiments, the second glass layer 104 is optically absorbing (e.g., having an optically absorbing band in the near infrared which extends into the red portion of the visible spectrum). As described further elsewhere herein, the optically absorbing material can be included in a skin layer 240 or in an adhesive layer 119, for example. The optically absorbing material may be included to reduce the brightness of the second ghost compared to the first ghost. In some embodiments, the second ghost portion 476 has a brightness less than a brightness of first ghost portion 474. In some embodiments, the second ghost portion 476 has a brightness less than 0.6, 0.5, 0.4, 0.3, 0.2, 0.1, 0.05, or 0.01 times a brightness of first ghost portion 474. The brightness of the first and second ghost portions are the peak values of the luminance distributions of the first and second ghost portions.

In some embodiments, the optically absorbing material has an absorbance depending on polarization. For example, in some embodiments, the reflective film has an average reflectance for a first polarization state in a predetermined visible wavelength range at a predetermined angle of incidence of at least 15% (or at least 20%, or at least 50% or at least 70%) and an average transmittance for an orthogonal second polarization state in the predetermined visible wavelength range at the predetermined angle of incidence of at least 30% (or at least 50%, or at least 70%), and the optically absorbing material is optically absorptive for light having the first polarization state and substantially optically transmissive for light having the second polarization state (e.g., the absorbance for the second polarizations state may be less than 0.2, or less than 0.1 times the absorbance for the first polarization state).

Figure 7:
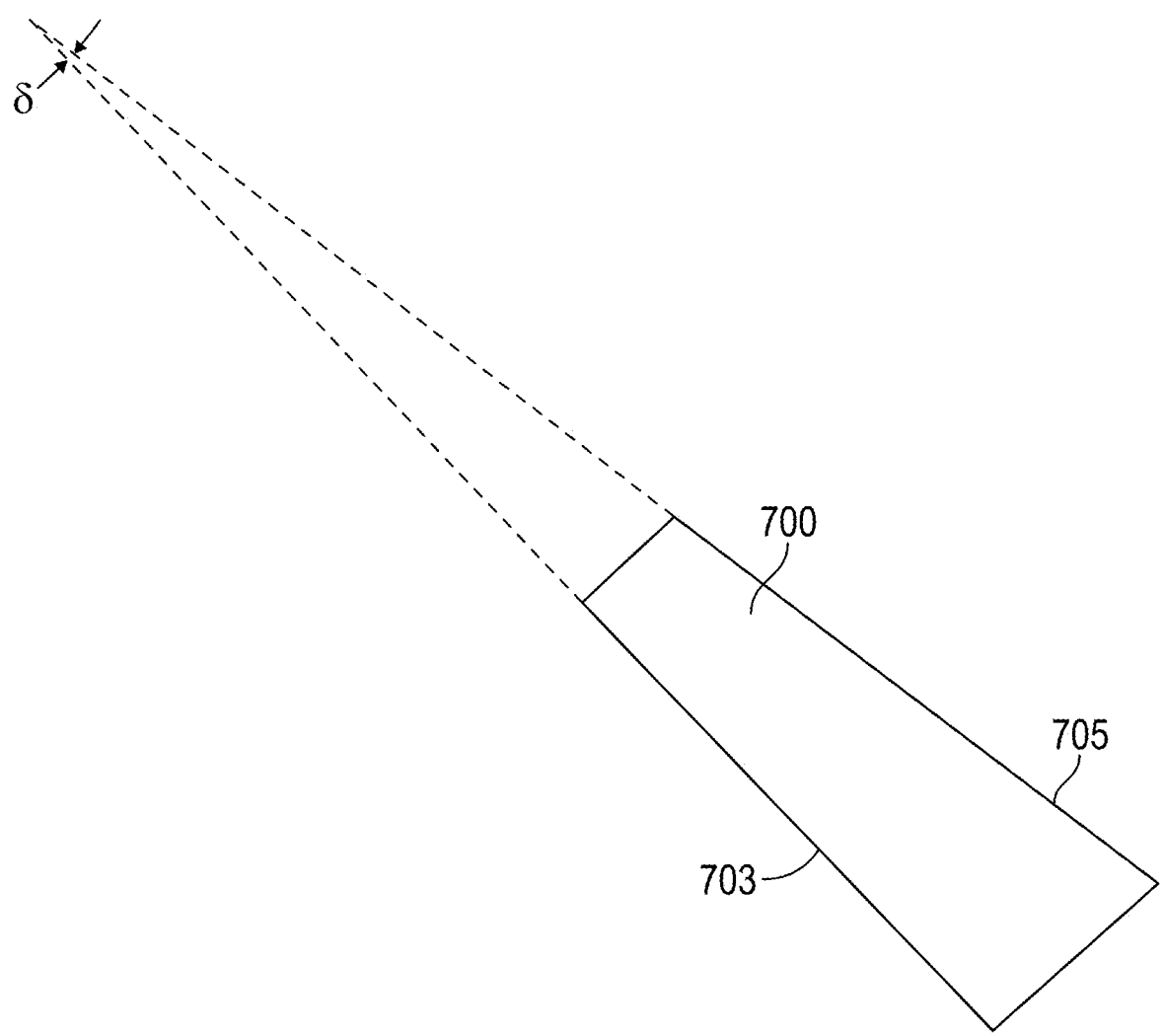
FIG. 7 is a schematic cross-sectional view of a glass laminate having opposed major surfaces defining an angle $\delta$ therebetween.

As used herein, "substantially parallel" outermost major surfaces are sufficiently close to parallel that any deviation from parallel results in a shift in a relative position of the peaks of the first and second ghost portions of less than 10 percent. Substantially parallel outermost major surfaces may be parallel or nominally parallel. FIG. 7 is a schematic illustration of a glass laminate 700 having outermost major surfaces 703 and 705 defining an angle δ therebetween. In some embodiments, substantially parallel outermost major surfaces define an angle δ therebetween of less than 0.05, 0.03, 0.02, 0.015, 0.012, 0.11, 0.01, 0.009, 0.007, 0.005, 0.003, or 0.001 degrees. The angle δ is an angle between tangent planes at the opposing outermost major surfaces a location on the glass laminate. In some embodiments, δ is in any of the above ranges for each location on the glass laminate or for each location over at least 80% or 90% of an area of the glass laminate. In some embodiments, the reflective film 110 is substantially parallel with the outermost major surface 103 in the sense that any deviation from parallel results in a shift in a relative position of the peaks of the first ghost and primary reflected image portions of less than 10 percent. Similarly, in some embodiments, the reflective film 110 is substantially parallel with the outermost major surface 105 in the sense that any deviation from parallel results in a shift in a relative position of the peaks of the second ghost and primary reflected image portions of less than 10 percent.

Figure 8:
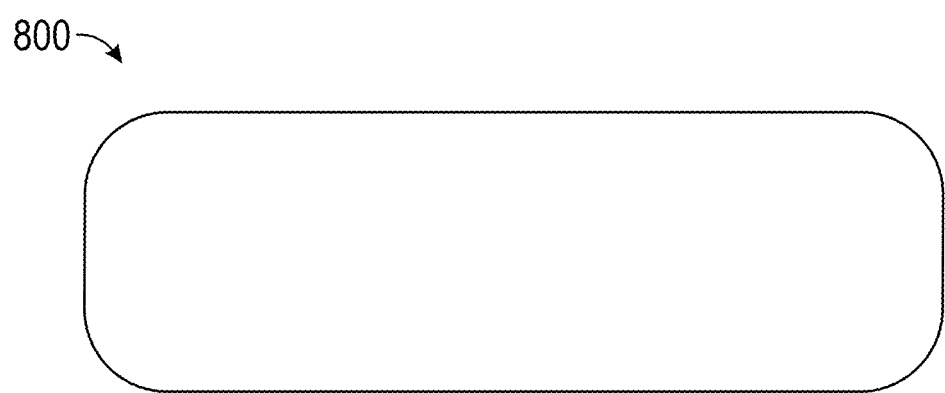
FIG. 8 is a schematic front view of a windshield.

FIG. 8 is a schematic front view of a windshield 800 which may be or include the glass laminate 100, for example. In some embodiments, the reflective film covers substantially the entire windshield 800 (e.g., at least 80% or at least 90% of a surface area of the windshield). In some embodiments, the reflective film and the first and second glass layers are substantially coextensive with one another (e.g., any of the first and second glass layers and the reflective film may cover at least 80% or at least 90% of a surface area of any other of the first and second glass layers and the reflective film).

The present application is related to U.S. Prov. Pat. Appl. No. 62/735,567, filed Sep. 24, 2018, which is hereby incorporated herein by reference in its entirety.

The following is a list of illustrative embodiments of the present description.

A first embodiment is a glass laminate comprising:
first and second glass layers having substantially parallel outermost major surfaces facing away from one another;
a reflective film having opposed first and second major surfaces and disposed between the first and second glass layers with the first and second major surfaces facing the respective first and second glass layers, the reflective film having an average reflectance for a first polarization state in a predetermined visible wavelength range at a predetermined angle of incidence of at least 15% and an average transmittance for an orthogonal second polarization state in the predetermined visible wavelength range at the predetermined angle of incidence of at least 30%;
a first adhesive layer disposed between and bonding together the first glass layer and the reflective film; and
a second adhesive layer disposed between and bonding together the second glass layer and the reflective film, the second adhesive layer being thicker than the first adhesive layer such that the first major surface of the reflective film is separated from the outermost major surface of the first glass layer by a distance d1, the second major surface of the reflective film is separated from the outermost major surface of the second glass layer by a distance d2, and $0.05 \leq d1/d2 \leq 0.9$.

A second embodiment is the glass laminate of the first embodiment, wherein $0.05 \leq d1/d2 \leq 0.8$, or $0.1 \leq d1/d2 \leq 0.8$, or $0.2 \leq d1/d2 \leq 0.7$.

A third embodiment is the glass laminate of the first or second embodiments, wherein the second adhesive layer is at least 2, 3, 5, 10, 20, 50, 100, or 200 times thicker than the first adhesive layer.

A fourth embodiment is the glass laminate of any one of the first to third embodiments, wherein the first adhesive layer has a thickness in a range of 1 micron to 75 microns and the second adhesive layer has a thickness in a range of 300 microns to 1000 microns.

A fifth embodiment is the glass laminate of any one of the first to fourth embodiments, wherein the second glass layer is at least 1.5 times thicker than the first glass layer.

A sixth embodiment is the glass laminate of any one of the first to fifth embodiments, wherein the average reflectance of the reflective film for the first polarization state in the predetermined visible wavelength range at the predetermined angle of incidence is at least 20%, and wherein the average transmittance if the reflective film for the second polarization state in the predetermined visible wavelength range at the predetermined angle of incidence is at least 50%.

A seventh embodiment is a glass laminate comprising:
first and second glass layers having substantially parallel outermost major surfaces; and
a reflective film comprising a plurality of alternating polymeric interference layers and disposed asymmetrically between the outermost major surfaces such that when a light source positioned within 2 m of the glass laminate projects a line onto the outermost major surface of the first glass layer along a first direction making an angle θ in a range of 30 degrees to 85 degrees with respect to a normal to the glass laminate so that the line extends along a second direction orthogonal to a first plane defined by the first direction and the normal and has a projected luminance distribution about a centerline of the projected line having a full width at half maximum of no more than 0.05 degrees, a first portion of the projected line reflects from the reflective film and a second portion of the projected line reflects from the outermost major surface of the first glass layer, a reflected image of the line comprising a primary reflected image portion defined by the reflected first portion and a first ghost portion defined by the reflected second portion, the first ghost portion substantially overlapping with the primary reflected image portion.

An eighth embodiment is the glass laminate of the seventh embodiment, wherein a third portion of the projected line reflects from the outermost major surface of the second glass layer, the reflected image of the line further comprising a second ghost portion defined by the reflected third portion, the second ghost portion substantially overlapping with the primary reflected image portion.

A ninth embodiment is the glass laminate of the seventh or eighth embodiments, wherein the reflected image has a reflected luminance distribution having a maximum at a peak of the reflected luminance distribution and decreasing monotonically in at least one lateral direction away from the peak to an edge of the reflected image.

A tenth embodiment is the glass laminate of any one of the seventh to ninth embodiments, wherein the full width at half maximum of the projected line is no more than 0.03 degrees, and wherein the reflected image has an angular distribution of luminance having a full width at half maximum of no more than 0.1 degrees.

An eleventh embodiment is the glass laminate of any one of the seventh to tenth embodiments, wherein the second ghost portion has a brightness less than 0.6, 0.5, 0.4, 0.3, 0.2, 0.1, 0.05, or 0.01 times a brightness of first ghost portion.

A twelfth embodiments is a glass laminate comprising:
first and second glass layers having substantially parallel outermost major surfaces; and
a reflective film comprising a plurality of alternating polymeric interference layers and disposed between and adhered to the first and second glass layers through respective first and second adhesive layers, the first adhesive layer having a thickness no more than 0.6 times a thickness of the second adhesive layer, such that when a light source projects a plurality of parallel lines onto the outermost major surface of the first glass layer along a first direction making an angle θ in a range of 30 degrees to 85 degrees with respect to a normal to the glass laminate so that the plurality of parallel lines extend along a second direction orthogonal to a first plane defined by the first direction and the normal and are spaced apart along a third direction in the first plane and orthogonal to the first direction, a first portion of each projected line reflects from the reflective film, a reflected image of each line comprising the reflected first portion, each reflected image having a luminance distribution defining a centerline of the reflected image, a distribution of an angle α between the centerlines of the reflected images and the second direction having a full width at half maximum of less than 3 degrees.

A thirteenth embodiment is the glass laminate of the twelfth embodiment, wherein the reflective film has an average reflectance for a first polarization state in a predetermined visible wavelength range at a predetermined angle of incidence of at least 15% and an average transmittance for an orthogonal second polarization state in the predetermined visible wavelength range at the predetermined angel of incidence of at least 30%.

A fourteenth embodiment is the glass laminate of the twelfth or thirteenth embodiment, wherein the first adhesive layer has a thickness in a range of 1 micron to 75 microns and the second adhesive layer has a thickness in a range of 300 microns to 1000 microns.

A fifteenth embodiment is the glass laminate of any one of the twelfth to fourteenth embodiments, wherein the full width at half maximum of the distribution of the angle α is less than 2 degrees, or less than 1.5 degrees, or less than 1.2 degrees.

EXAMPLES

Reflective Film WCF

A reflective film, referred to as windshield combiner film (WCF), was made by extruding and uniaxially orienting 275 alternating polymer layers plus two outermost skin layers as generally described in U.S. Pat. No. 6,827,886 (Neavin et al.). The alternating polymer layers were oriented PET as the higher index layers and crystalline PETg as the lower index layers. The layer thicknesses were selected to produce reflectivity throughout the visible wavelength range of 400 nm to 700 nm. The film had an average reflectance in the visible range at an angle of incidence of 60 degrees of about 20% for p-polarized light and was substantially transmissive for s-polarized light.

Example 1

The reflective film WCF was laminated between first and second 2.1 mm thick glass layers with a 1 mil thick layer of 3M 8146 bonding the reflective film to the first glass layer and a 0.76 mm thick PVB layer (formed from two 0.38 mm thick PVB layers) bonding the reflective film to the second glass layer.

Figure 9:
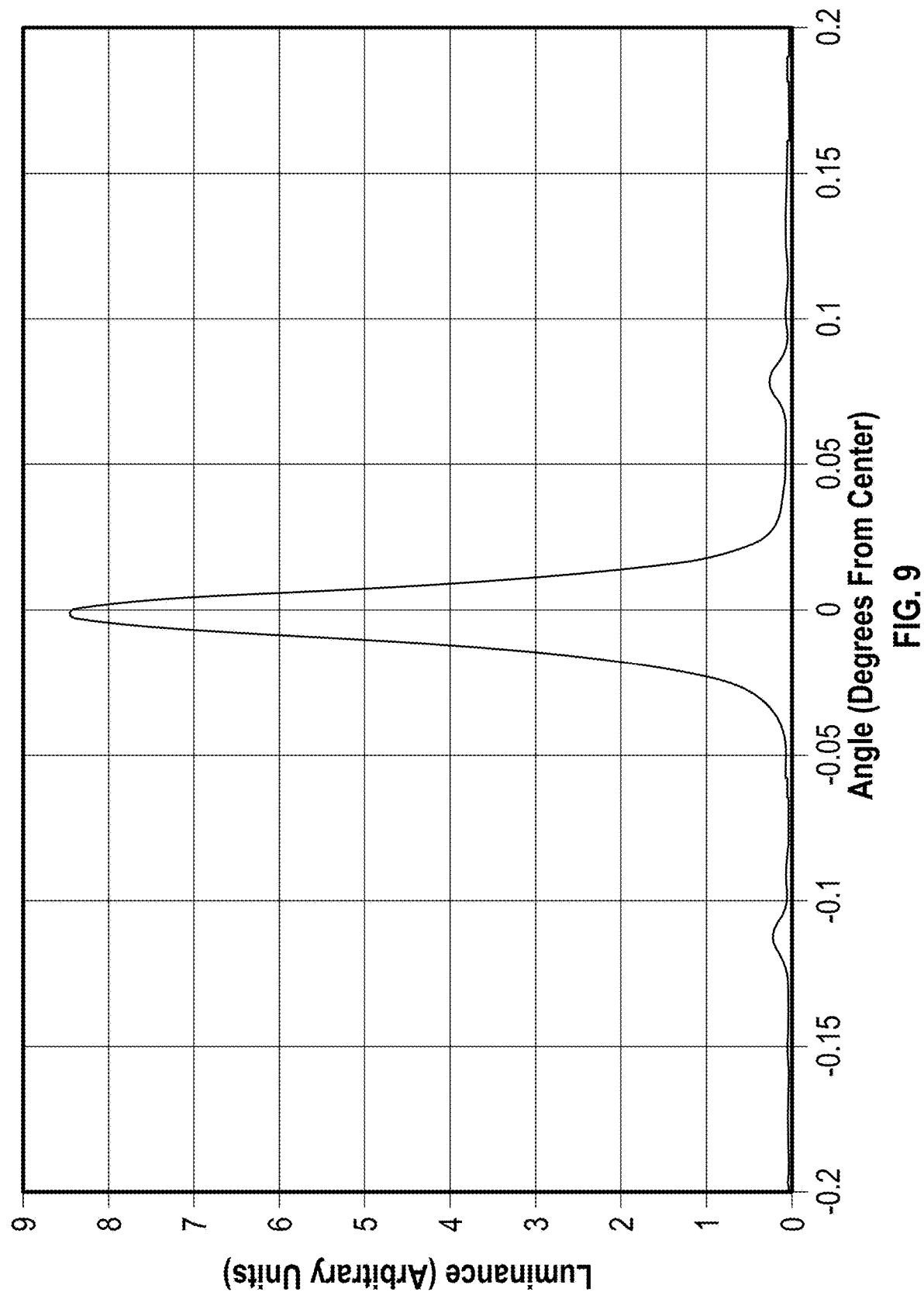
FIGS. 9-12 are luminance distributions across reflected images of projected lines.

An Apple Inc. (Cupertino, CA) IPAD (first generation) was used to project a line onto the first glass layer of the glass laminate at an angle of incidence of about 65 degrees. The line image was 2 pixels wide. The reflected luminance distribution was determined using a PROMETRIC 18 imaging colorimeter available from Radiant Vision Systems (Redmond, WA) as a function of angle (e.g., the angle φ of FIG. 1B) from a central peak of the primary reflected image and is shown in FIG. 9. The primary reflected image had a full width at half maximum of about 0.02 degrees. A first ghost image was present at about 0.08 degrees from the primary reflected image and a second ghost image was present at about-0.11 degrees from the primary reflected image.

Example 2

Figure 10:
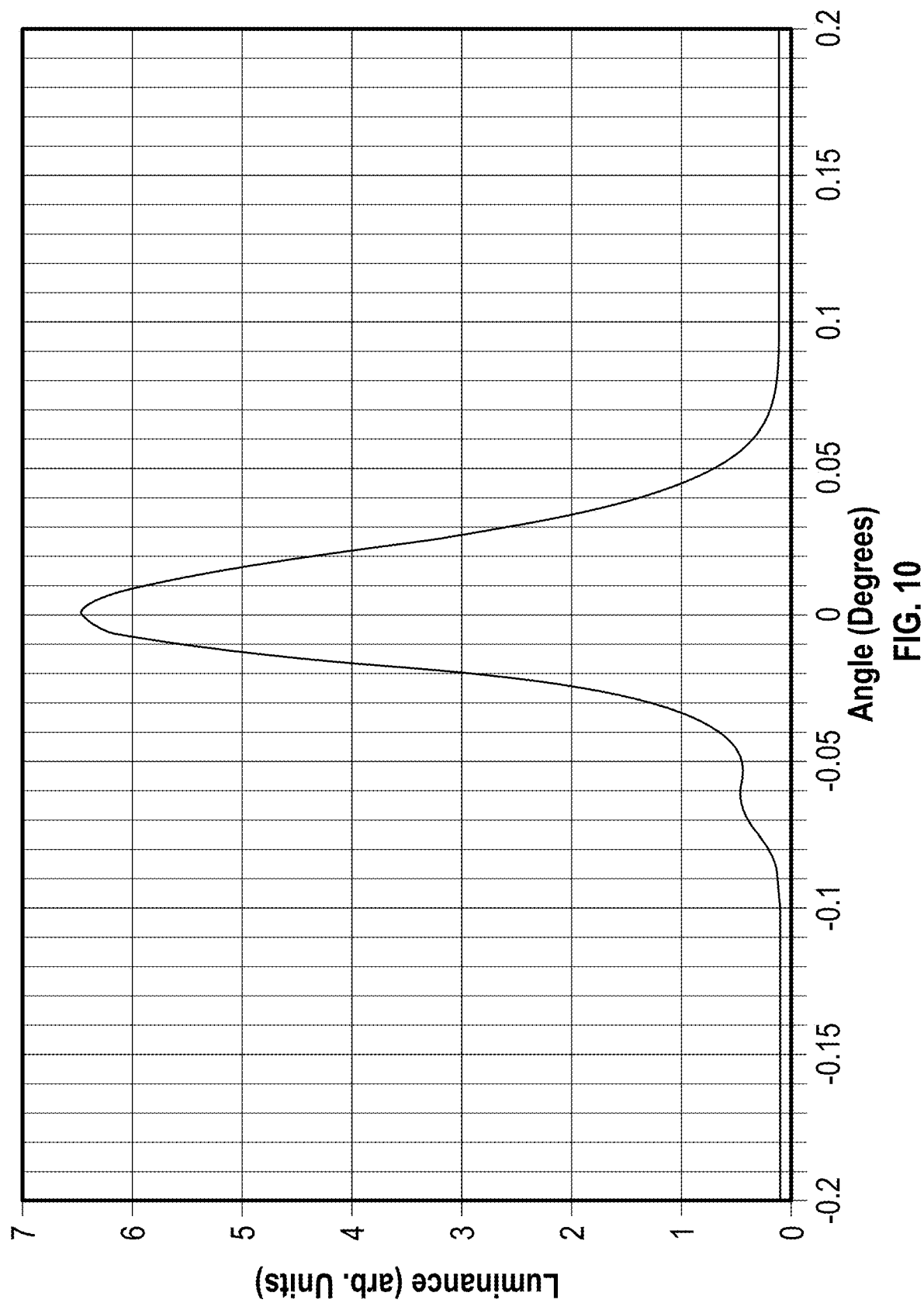
Figure 11:
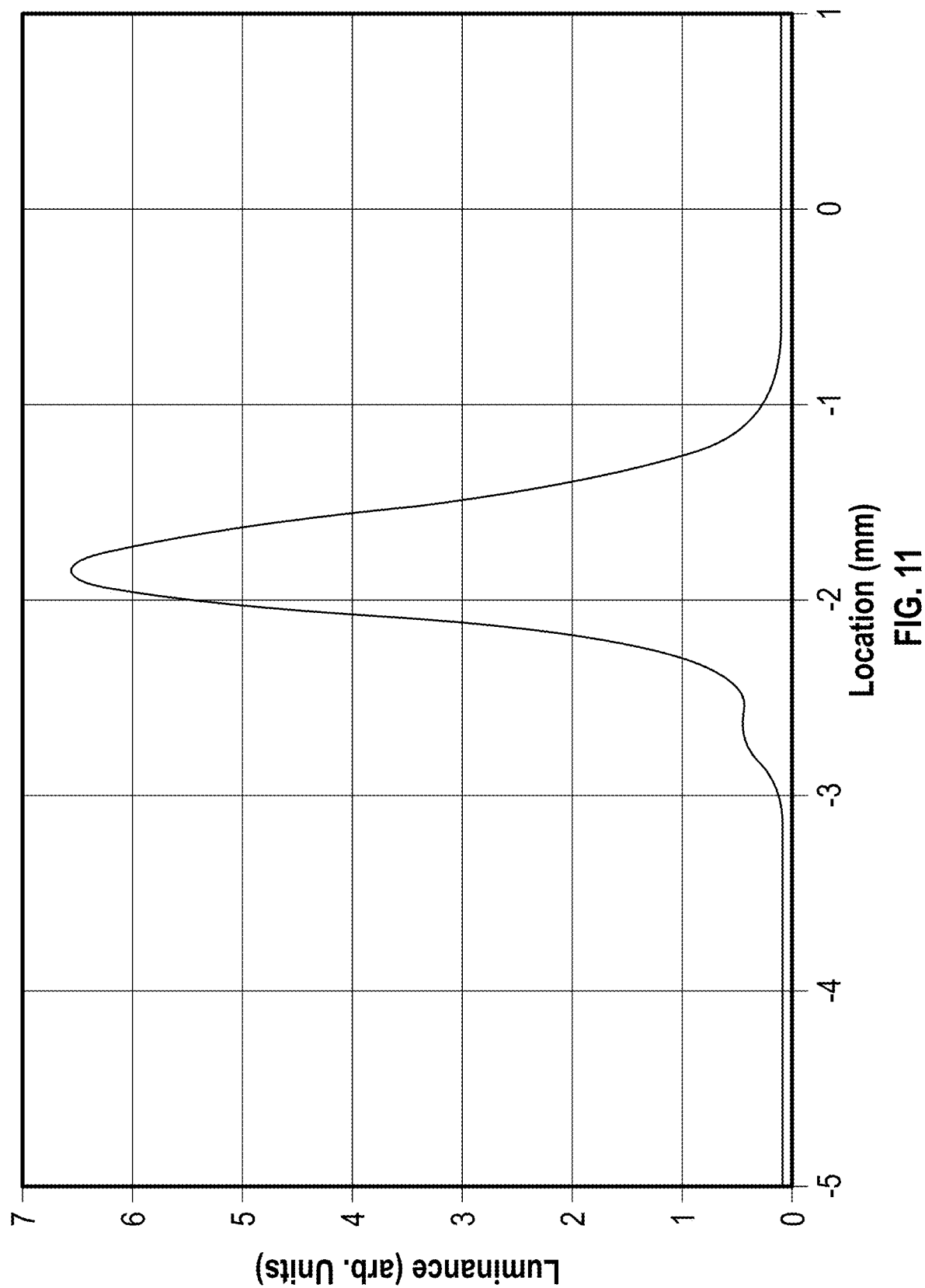

Example 2 was prepared and tested as described for Example 1 except that the first and second glass layers were each 1 mm thick. The resulting reflected luminance distribution is shown in FIGS. 10-11 as a function of angle (e.g., the angle φ of FIG. 1B) and location (e.g., the x-coordinate of FIG. 1A), respectively. The first and second ghost images substantially overlap with the primary reflected image.

Comparative Example C1

Figure 12:
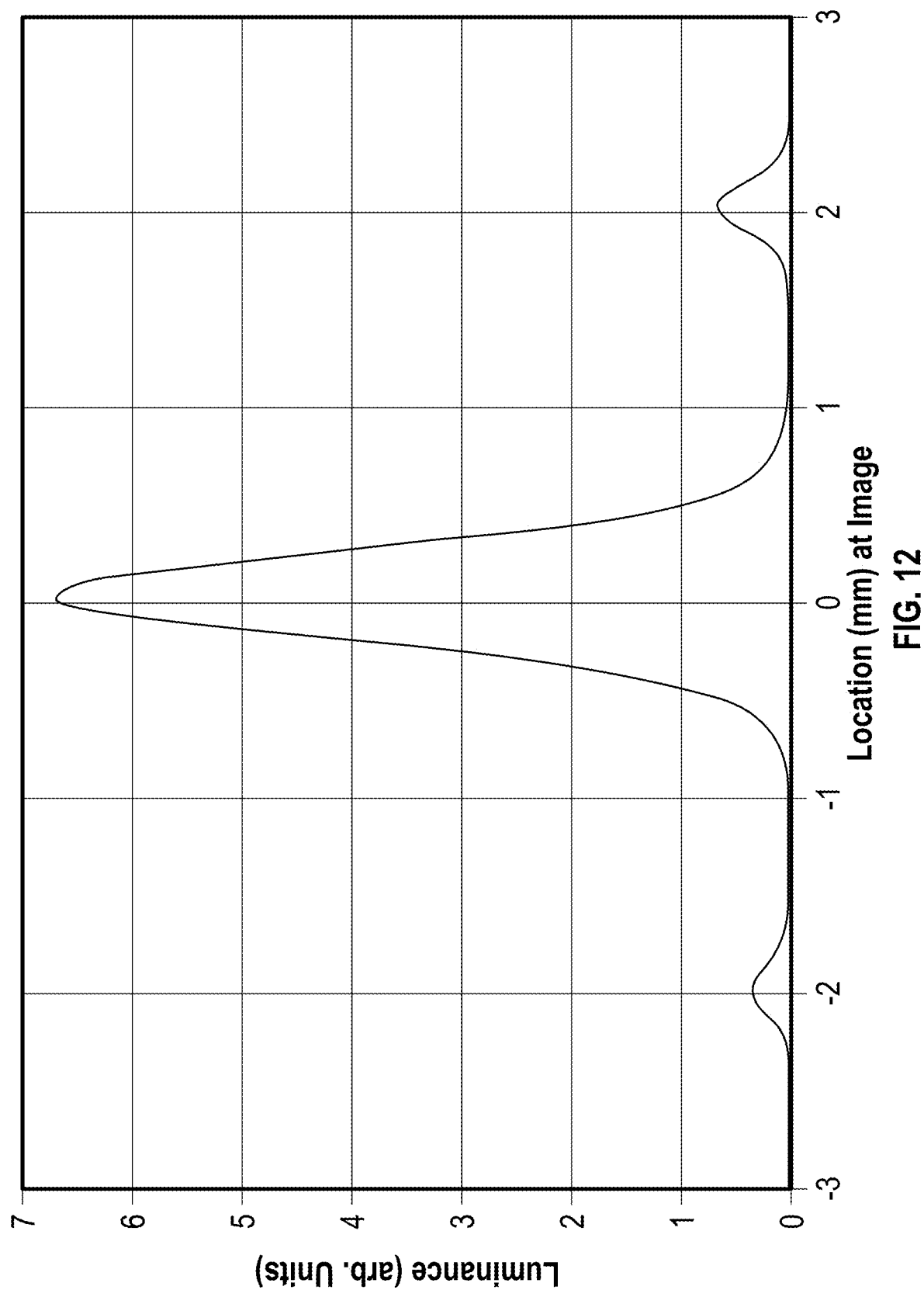

Comparative Example C1 was prepared and tested as described for Example 1 except that the first adhesive layer was a 0.76 mm thick PVB layer. The resulting reflected luminance distribution is shown in FIG. 12 as a function of location (x-coordinate of FIG. 1A). The first and second ghost images has a sufficiently high luminance and were sufficiently displaced from the primary reflected image to cause objectionable loss of image fidelity.

Examples 3-4

Example 3 was prepared as described for Example 1 except that the first adhesive layer was a 0.38 mm thick PVB layer. Example 4 was prepared as described for Example 1 except that the first glass layer was 3.2 mm thick. Using a thicker glass layer is expected to affect the position of the ghost image but is expected to have a negligible effect on line waviness.

Figure 13C:
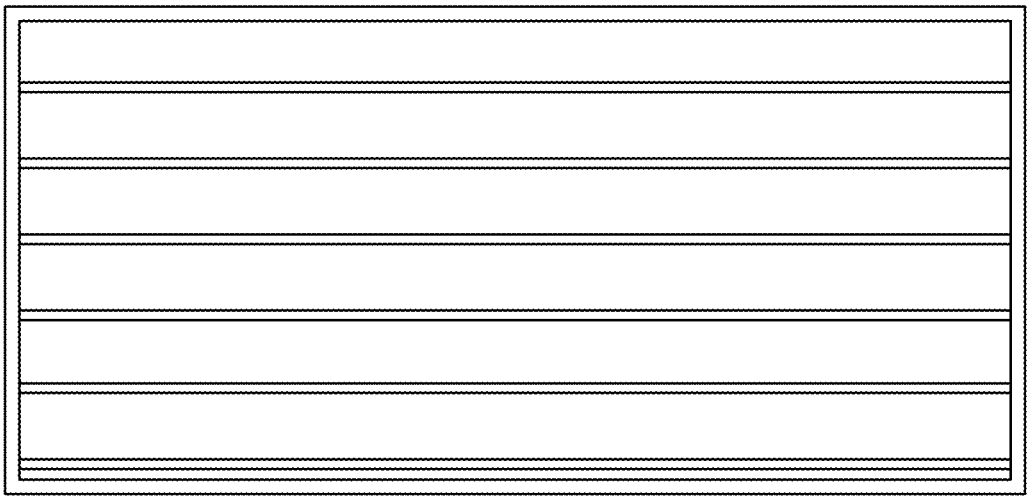
FIGS. 13A-13C are reflected images of pluralities of projected lines.
Figure 13B:
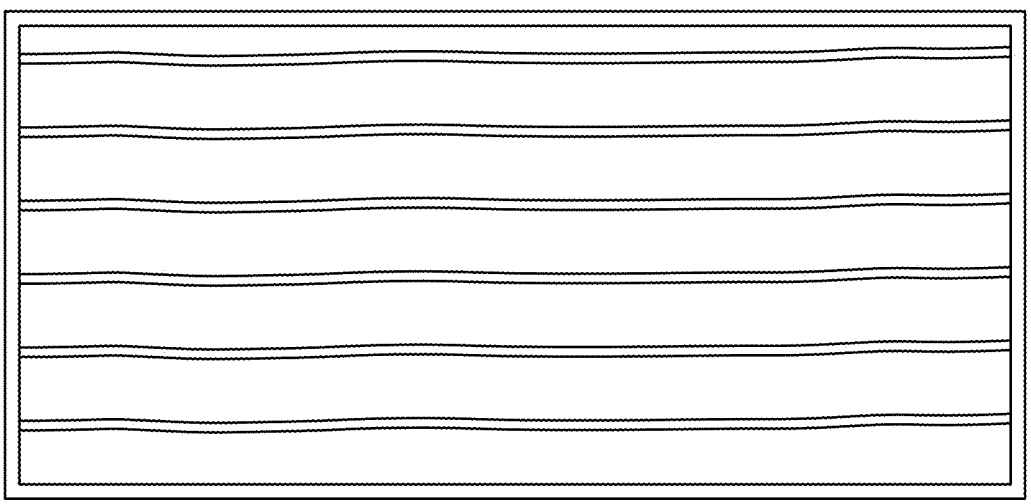
Figure 13A:
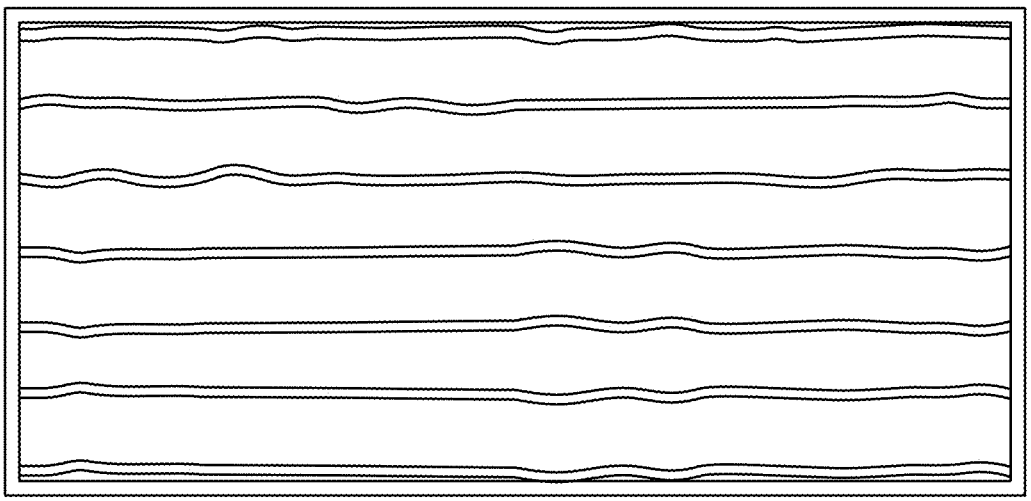
Figure 14:
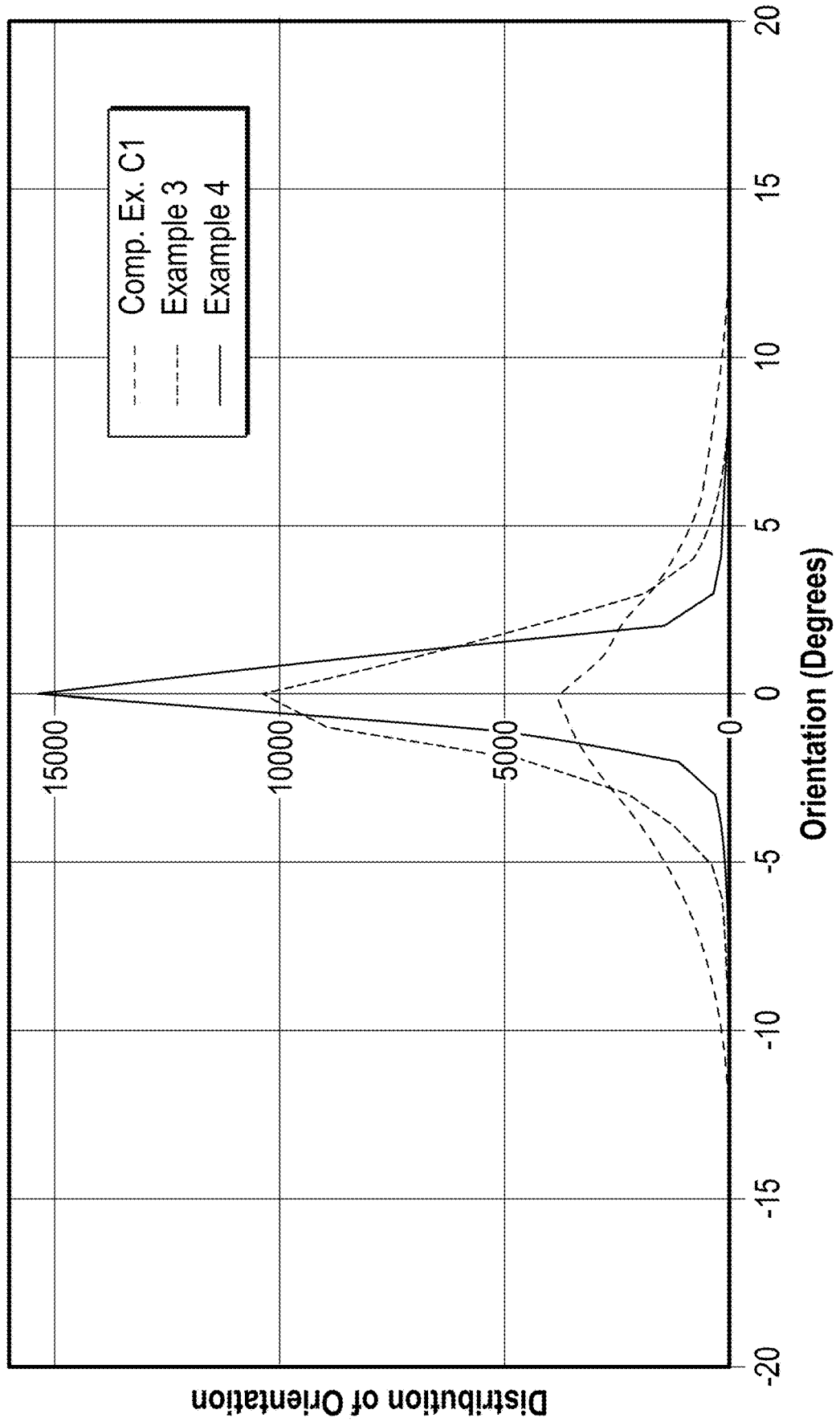
FIG. 14 is a plot of a distribution of centerlines of reflected lines.

A plurality of parallel lines was projected onto the reflective film through the first glass layer of the glass laminate of Comparative Example C1, Example 3 and Example 4 at an angle of incidence on the glass laminate of about 55 degrees and the reflected image was analyzed using the PROMETRIC colorimeter. The reflected images for Comparative Example C1, Example 3 and Example 4 are shown in FIGS. 13A-13C, respectively. A centerline tangent to each line was determined at a sufficient number of locations along each line to determine a distribution of orientation of the centerline tangent using an image analysis procedure generally described in "Experimental investigation of collagen waviness and orientation in the arterial adventitia using confocal laser scanning microscopy", Rezakhaniha et al., *Biomech Model Mechanobiol*, 2012 March; 11 (3-4); 461-73; doi: 10.1007/s10237-011-0325-z. The resulting distribution is plotted in FIG. 14. The full width at half maximum for each distribution was determined and found to be 4.0 degrees, 1.9 degrees, and 1.0 degrees for Comparative Example C1, Example 3 and Example 4, respectively.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A glass laminate comprising:
   first and second glass layers having substantially parallel outermost major surfaces; and
   a reflective film comprising a plurality of alternating polymeric interference layers and disposed asymmetrically between the outermost major surfaces such that when a light source positioned within 2 m of the glass laminate projects a line onto the outermost major surface of the first glass layer along a first direction making an angle $\theta$ in a range of 30 degrees to 85 degrees with respect to a normal to the glass laminate so that the line extends along a second direction orthogonal to a first plane defined by the first direction and the normal and has a projected luminance distribution about a centerline of the projected line having a full width at half maximum of no more than 0.05 degrees, a first portion of the projected line reflects from the reflective film and a second portion of the projected line reflects from the outermost major surface of the first glass layer, a reflected image of the line comprising a primary reflected image portion defined by the reflected first portion and a first ghost portion defined by the reflected second portion, the first ghost portion substantially overlapping with the primary reflected image portion.

2. The glass laminate of claim 1, wherein a third portion of the projected line reflects from the outermost major surface of the second glass layer, the reflected image of the line further comprising a second ghost portion defined by the reflected third portion, the second ghost portion substantially overlapping with the primary reflected image portion.

3. The glass laminate of claim 1, wherein the reflected image has a reflected luminance distribution having a maximum at a peak of the reflected luminance distribution and decreasing monotonically in at least one lateral direction away from the peak to an edge of the reflected image.

4. The glass laminate of claim 1, wherein the full width at half maximum of the projected line is no more than 0.03 degrees, and wherein the reflected image has an angular distribution of luminance having a full width at half maximum of no more than 0.1 degrees.

5. The glass laminate of claim 1, wherein the second ghost portion has a brightness less than 0.6 times a brightness of first ghost portion.

* * * * *